(12) United States Patent
Chavan et al.

(10) Patent No.: US 10,500,445 B1
(45) Date of Patent: Dec. 10, 2019

(54) GRAPHENE REINFORCED POLYMERS FOR USE IN A GOLF BALL

(71) Applicant: Callaway Golf Company, Carlsbad, CA (US)

(72) Inventors: Vijay Chavan, Vista, CA (US); David Bartels, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 16/295,275

(22) Filed: Mar. 7, 2019

Related U.S. Application Data

(60) Provisional application No. 62/640,472, filed on Mar. 8, 2018.

(51) Int. Cl.

| | | |
|---|---|---|
| A63B 37/00 | (2006.01) | |
| C08L 23/04 | (2006.01) | |
| C08L 23/08 | (2006.01) | |
| B29L 31/54 | (2006.01) | |
| B29C 43/00 | (2006.01) | |
| B29K 19/00 | (2006.01) | |
| B29K 507/04 | (2006.01) | |

(52) U.S. Cl.
CPC ...... *A63B 37/0039* (2013.01); *A63B 37/0033* (2013.01); *A63B 37/0044* (2013.01); *A63B 37/0045* (2013.01); *A63B 37/0075* (2013.01); *A63B 37/0076* (2013.01); *A63B 37/0092* (2013.01); *C08L 23/0876* (2013.01); *A63B 37/0078* (2013.01); *A63B 2037/0079* (2013.01); *B29C 43/003* (2013.01); *B29K 2019/00* (2013.01); *B29K 2507/04* (2013.01); *B29L 2031/546* (2013.01)

(58) Field of Classification Search
CPC ............ A63B 37/0039; A63B 37/0076; A63B 37/0075; A63B 37/0092; B29K 2507/04; B29K 2019/00; B29C 43/003; B29L 2031/546
See application file for complete search history.

(56) References Cited

U.S. PATENT DOCUMENTS

| | | | |
|---|---|---|---|
| 1,191,383 | A | 7/1916 | Aylsworth |
| 3,492,197 | A | 1/1970 | Olstowski et al. |
| 4,844,471 | A | 7/1989 | Terence et al. |
| 4,911,451 | A | 3/1990 | Sullivan et al. |
| 4,986,545 | A | 1/1991 | Sullivan |
| 5,048,838 | A | 9/1991 | Chikaraishi et al. |
| 5,252,652 | A | 10/1993 | Egashira et al. |
| 5,588,924 | A | 12/1996 | Sullivan et al. |
| 5,688,595 | A | 11/1997 | Yamagishi et al. |
| 5,721,304 | A | 2/1998 | Pasqua |
| 5,725,442 | A | 3/1998 | Higuchi et al. |
| 5,779,562 | A | 7/1998 | Melvin et al. |
| 5,816,937 | A | 10/1998 | Shimosaka et al. |
| 5,830,086 | A | 11/1998 | Hayashi et al. |
| 5,980,396 | A | 11/1999 | Moriyama et al. |
| 6,117,026 | A | 9/2000 | Hayashi et al. |

(Continued)

*Primary Examiner* — John E Simms, Jr.
(74) *Attorney, Agent, or Firm* — Michael A. Catania; Sonia Lari; Rebecca Hanovice

(57) ABSTRACT

A golf ball with a mantle layer comprising an ionomer material and a graphene material in an amount ranging from 0.1 to 5.0 weight percent of the mantle layer is disclosed herein. The golf ball may multiple layers. A preferred embodiment of a golf ball comprises a core, a mantle layer and a cover.

5 Claims, 21 Drawing Sheets

(56) References Cited

U.S. PATENT DOCUMENTS

| | | |
|---|---|---|
| 6,123,630 A | 9/2000 | Hayashi et al. |
| 6,142,886 A | 11/2000 | Sullivan et al. |
| 6,248,027 B1 | 6/2001 | Hayashi et al. |
| 6,251,031 B1 | 6/2001 | Hayashi et al. |
| 6,277,034 B1 | 8/2001 | Nesbitt et al. |
| 6,299,550 B1 | 10/2001 | Molitor et al. |
| 6,361,454 B1 | 3/2002 | Yoshida et al. |
| 6,443,858 B2 | 9/2002 | Bartels et al. |
| 6,461,251 B1 | 10/2002 | Yamagishi et al. |
| 6,461,253 B2 | 10/2002 | Ogg |
| 6,468,169 B1 | 10/2002 | Hayashi et al. |
| 6,478,697 B2 | 11/2002 | Yagley et al. |
| 6,482,345 B1 | 11/2002 | Dewanjee |
| 6,495,633 B1 | 12/2002 | Sullivan et al. |
| 6,520,870 B2 | 2/2003 | Tzivanis et al. |
| 6,565,455 B2 | 5/2003 | Hayashi et al. |
| 6,565,456 B2 | 5/2003 | Hayashi et al. |
| 6,626,770 B2 | 9/2003 | Takemura et al. |
| 6,653,382 B1 | 11/2003 | Statz et al. |
| 6,685,579 B2 | 2/2004 | Sullivan |
| 6,705,956 B1 | 3/2004 | Moriyama et al. |
| 6,743,122 B2 | 6/2004 | Hayashi et al. |
| 6,849,006 B2 | 2/2005 | Cavallaro et al. |
| 6,994,638 B2 | 2/2006 | Rajagopalan et al. |
| 7,121,959 B1 | 10/2006 | Yoshida et al. |
| 7,220,191 B2 | 5/2007 | Onoda et al. |
| 7,226,367 B2 | 6/2007 | Iguchi et al. |
| 7,303,490 B2 | 12/2007 | Takesue et al. |
| 7,335,114 B2 | 2/2008 | Hebert et al. |
| 7,361,102 B2 | 4/2008 | Ladd et al. |
| 7,537,531 B2 | 5/2009 | Ladd et al. |
| 7,591,741 B2 | 9/2009 | Sullivan et al. |
| 7,874,939 B2 | 1/2011 | Sullivan et al. |
| 7,918,748 B2 | 4/2011 | Ogg et al. |
| 8,025,593 B2 | 9/2011 | Rajagopalan et al. |
| 8,109,843 B2 | 2/2012 | Hebert et al. |
| 8,425,351 B2 | 4/2013 | Ogg et al. |
| 8,475,298 B2 | 7/2013 | Ogg et al. |
| 8,651,976 B1 | 2/2014 | Ogg et al. |
| 8,876,635 B1 | 11/2014 | Ogg |
| 9,370,694 B2 | 6/2016 | Luciano, Jr. et al. |
| 9,393,462 B2 | 7/2016 | Farrell |
| 2002/0065149 A1 | 5/2002 | Tzivanis et al. |
| 2002/0151380 A1* | 10/2002 | Sullivan .............. A63B 37/12 473/354 |
| 2002/0165045 A1 | 11/2002 | Ogg et al. |
| 2005/0020385 A1* | 1/2005 | Onoda .............. A63B 37/0003 473/371 |
| 2005/0037866 A1 | 2/2005 | Emerson et al. |
| 2005/0059509 A1* | 3/2005 | Takesue ............ A63B 37/0003 473/371 |
| 2005/0250601 A1 | 11/2005 | Kim et al. |
| 2005/0272867 A1 | 12/2005 | Hogge et al. |
| 2006/0264269 A1 | 11/2006 | Rajagopalan et al. |
| 2006/0270790 A1 | 11/2006 | Comeau |
| 2008/0058121 A1 | 3/2008 | Comeau |
| 2012/0202620 A1* | 8/2012 | Ogg .................. A63B 37/0003 473/373 |
| 2013/0165261 A1 | 6/2013 | Luciano, Jr. et al. |
| 2015/0133593 A1* | 5/2015 | Kissell .................. C08K 5/175 524/496 |
| 2015/0343270 A1 | 12/2015 | DuFaux |
| 2015/0375051 A1 | 12/2015 | Shiga et al. |
| 2015/0375062 A1 | 12/2015 | Farrell |
| 2016/0279482 A1 | 9/2016 | DuFaux et al. |

\* cited by examiner

GRAPHENE REINFORCED POLYMERS FOR USE IN A GOLF BALL

CROSS REFERENCES TO RELATED APPLICATIONS

The Present Application claims priority to U.S. Provisional Patent Application No. 62/640,472, filed on Mar. 8, 2018, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to the use of graphene in layers of a golf ball.

Description of the Related Art

Typical process of synthesizing exfoliated graphite (individual sheets of exfoliated graphite are also known as graphene or graphene nanoplatelets) includes reacting graphite with acids such as nitric and or sulfuric acid followed by heat treatment and chemical reduction. Exfoliated graphite is a two dimensional planar sheet made of $SP^2$-hybridized carbon. Graphene (individual sheets of reduced exfoliated graphite) sheets are typically few nanometers thick and few microns wide (aspect ratio of >1000). This high aspect ratio of graphene coupled with their high tensile strength (tensile strength in GPa compared to MPa for polymers) can lead to polymeric composite materials with very high tensile and flexural properties. Graphene's unusually high thermal conductivity (~3000 W/mk compared to <1 W/mk for typical thermoplastic polymers; can be utilized in making thermally conductive composite materials. For thermally cured elastomeric products, this high thermal conductivity can mean shorter, more uniform curing cycles that can lead to higher production volumes.

Various examples of exfoliated graphite (also called graphene) based composites can be found in literature. Wang et al. describe expanded graphite polyethylene composite for electromagnetic radiation interference (EMI) shielding applications.

U.S. Pat. No. 4,946,892 describes synthesis of exfoliated graphene based composite by compression molding graphite with polyimide resin under high heat (200 C) and pressure (80 kPa).

Shioyama describes synthesis of polyisoprene and polystyrene based composite materials by in-situ polymerization of styrene and isoprene monomers in presence of exfoliated graphite.

U.S. Pat. No. 5,776,372 describes an electrically conductive nanocomposite made with expanded graphite and various polymers such as polypropylene, polytetrafluoroethylene, and phenolic resin. Pan et al. describe synthesis of nylon-6 expanded graphite nanocomposite by polymerization of ε-caprolactam in presence of expanded graphite.

Chen et al. describe in-situ polymerization of methyl methacrylate in presence of expanded graphite to obtain an electrically conductive nanocomposite.

Xiao et al. describe making exfoliated graphite composite with improved thermal stability by in-situ polymerization of styrene in presence of exfoliated graphene.

The prior art fails to even recognize this problem.

BRIEF SUMMARY OF THE INVENTION

The primary purpose of the present invention is to improve durability of golf ball core by incorporation of graphene in the core to improve the impact strength of the ball. This benefit can be seen in either a ball with single piece core, or a dual core with an outer core firmer than the inner core. Improved durability of the core by using graphene can result in higher mean time to fail (MTTF) upon repeated impact in a high speed testing device, or with a golf club in normal play.

Another objective is to improve aging properties due to the incorporation of graphene in the core for better retention of compression and COR over time.

One aspect of the present invention is a golf ball comprising a layer with a graphene material or a graphene oxide material in an amount ranging from 0.1 to 5.0 weight percent of the layer.

In a more preferred embodiment, the graphene material or a graphene oxide material ranges from 0.4 to 2.5 weight percent of the layer. In an even more preferred embodiment, the graphene material or a graphene oxide material ranges from 0.6 to 1.5 weight percent of the layer.

Another aspect of the present invention is a golf ball comprising a center core, an outer core, an inner mantle layer, an outer mantle layer, and a cover. The center core comprises a polybutadiene material and a graphene material in an amount ranging from 0.1 to 5.0 weight percent of the center core. The outer core is disposed over the center core. The inner mantle layer is disposed over the outer core. The inner mantle layer has a thickness ranging from 0.03 inch to 0.09 inch. The inner mantle layer is composed of an ionomer material. The inner mantle layer material has a plaque Shore D hardness ranging from 34 to 55. The outer mantle layer is disposed over the inner mantle layer. The outer mantle layer has a thickness ranging from 0.025 inch to 0.050 inch. The cover layer is disposed over the outer mantle layer. The cover layer has a thickness ranging from 0.025 inch to 0.040 inch. The cover layer has a lower Shore D hardness than the outer mantle layer. The outer mantle layer has a higher Shore D hardness than the inner mantle layer. The outer core has a higher Shore D hardness than the inner mantle layer and the center core.

Yet another aspect of the present invention is a golf ball comprising a center core, an outer core, an inner mantle layer, an outer mantle layer, and a cover. The center core comprises a polybutadiene material and a graphene material in an amount ranging from 0.1 to 5.0 weight percent of the center core. The outer core is disposed over the center core. The inner mantle layer is disposed over the outer core. The inner mantle layer has a thickness ranging from 0.03 inch to 0.09 inch. The inner mantle layer material has a plaque Shore D hardness ranging from 30 to 50. The outer mantle layer is disposed over the inner mantle layer. The outer mantle layer has a thickness ranging from 0.025 inch to 0.070 inch. The outer mantle layer material has a plaque Shore D hardness ranging from 50 to 71. The inner mantle is thicker than the outer mantle, and the outer mantle is harder than the inner mantle. The cover layer is disposed over the outer mantle layer. The cover layer has a thickness ranging from 0.025 inch to 0.050 inch. The cover layer has a Shore D hardness less than the hardness of the outer mantle layer. The outer mantle layer has a higher Shore D hardness than the inner mantle layer. The outer core has a higher Shore D hardness than the inner mantle layer and the center core.

Yet another aspect of the present invention is a golf ball comprising a center core, an outer core, an inner mantle layer, an outer mantle layer, and a cover. The center core comprises a polybutadiene material and a graphene material in an amount ranging from 0.1 to 5.0 weight percent of the center core. The outer core is disposed over the center core. The inner mantle layer is disposed over the outer core. The inner mantle layer has a thickness ranging from 0.03 inch to 0.09 inch. The inner mantle layer material has a plaque Shore D hardness ranging from 36 to 44. The outer mantle layer is disposed over the inner mantle layer. The outer mantle layer has a thickness ranging from 0.025 inch to 0.070 inch. The outer mantle layer material has a plaque Shore D hardness ranging from 65 to 71. The inner mantle is thicker than the outer mantle, and the outer mantle is harder than the inner mantle. The cover layer is disposed over the outer mantle layer. The cover layer has a thickness ranging from 0.025 inch to 0.040 inch. The cover layer has a lower Shore D hardness than the outer mantle layer, the outer mantle layer has a higher Shore D hardness than the inner mantle layer, and the outer core has a higher Shore D hardness than the inner mantle layer and the center core.

Yet another aspect of the present invention is a golf ball comprising a center core, an inner mantle layer, a first center mantle layer, a second center mantle layer, an outer mantle layer, and a cover. The center core comprises a polybutadiene material and a graphene material in an amount ranging from 0.1 to 5.0 weight percent of the center core. The inner mantle layer is disposed over the center core. The inner mantle layer has a thickness ranging from 0.030 inch to 0.050 inch. The inner mantle layer material has a plaque Shore D hardness ranging from 30 to 40. The inner mantle layer is composed of a composed of an ionomer material. The first center mantle layer is disposed over the inner mantle layer. The first center mantle layer has a thickness ranging from 0.030 inch to 0.050 inch. The first center mantle layer material has a plaque Shore D hardness ranging from 40 to 55. The first center mantle layer is composed of a fully neutralized polymer material. The second center mantle layer is disposed over the second center mantle layer. The second center mantle layer has a thickness ranging from 0.030 inch to 0.050 inch. The second center mantle layer material has a plaque Shore D hardness ranging from 45 to 55. The second center mantle layer is composed of a fully neutralized polymer material. The outer mantle layer is disposed over the second center mantle layer. The outer mantle layer has a thickness ranging from 0.030 inch to 0.050 inch. The outer mantle layer is composed of an ionomer material. The outer mantle layer material has a plaque Shore D hardness ranging from 60 to 75. The cover layer is disposed over the outer mantle layer, and has a thickness ranging from 0.025 inch to 0.040 inch.

Yet another aspect of the present invention is a golf ball comprising a center core, an inner mantle layer, a first center mantle layer, a second center mantle layer, an outer mantle layer, and a cover. The center core comprises a polybutadiene material and a graphene material in an amount ranging from 0.1 to 5.0 weight percent of the center core. The inner mantle layer is disposed over the center core. The inner mantle layer has a thickness ranging from 0.030 inch to 0.050 inch. The inner mantle layer material has a plaque Shore D hardness ranging from 30 to 40. The inner mantle layer is composed of a composed of an ionomer material. The first center mantle layer is disposed over the inner mantle layer. The first center mantle layer has a thickness ranging from 0.030 inch to 0.050 inch. The first center mantle layer material has a plaque Shore D hardness ranging from 40 to 55. The first center mantle layer is composed of a fully neutralized polymer material. The second center mantle layer is disposed over the second center mantle layer. The second center mantle layer has a thickness ranging from 0.030 inch to 0.050 inch. The second center mantle layer material has a plaque Shore D hardness ranging from 45 to 55. The second center mantle layer is composed of a fully neutralized polymer material. The outer mantle layer is disposed over the second center mantle layer. The outer mantle layer has a thickness ranging from 0.030 inch to 0.050 inch. The outer mantle layer is composed of an ionomer material. The outer mantle layer material has a plaque Shore D hardness ranging from 60 to 75. The cover layer is disposed over the outer mantle layer, and has a thickness ranging from 0.025 inch to 0.040 inch.

A yet another aspect of the present invention is a method for forming a core for a golf ball. The method includes mixing a graphene material with a polybutadiene material to form a core mixture, wherein the graphene material ranges from 0.1 to 5.0 weight percent of the core mixture. The method also includes compression molding a core from the core mixture. The core preferably has a diameter ranging from 0.70 inch to 1.6 inch. The core mixture preferably comprises 40-90 weight percent of polybutadiene, 0.4 to 2.5 weight percent graphene material, 1-30 weight percent polyisoprene, 10-50 weight percent zinc diacrylate, 1-30 weight percent zinc oxide, 1-20 weight percent zinc stearate, and 0.1-10 weight percent peroxide initiator.

A more preferred embodiment of the method includes forming a cover over the core.

A more preferred embodiment of the method includes forming a mantle layer over the core.

A more preferred embodiment of the method includes that the core mixture is molded over an inner core to produce a dual core with a diameter ranging from 0.7 inch to 1.6 inches.

A more preferred embodiment of the method includes compression molding a core from the core mixture comprises compression molding an outer core layer over a center core comprising a polybutadiene mixture.

A more preferred embodiment of the method includes compression molding a core from the core mixture comprises compression molding a center core and an outer core over the center core, and the center core and the outer core comprise the core mixture.

Yet another aspect of the invention is a golf ball comprising an inner core, an outer core comprising a polybutadiene and a graphene material in an amount ranging from 0.1 to 5.0 weight percent of the outer core, a mantle layer and a cover.

Yet another aspect of the invention is a golf ball comprising an inner core comprising a polybutadiene and a graphene material in an amount ranging from 0.1 to 5.0 weight percent of the inner core, an outer core comprising a polybutadiene and a graphene material in an amount ranging from 0.1 to 5.0 weight percent of the outer core, a mantle layer, and a cover.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
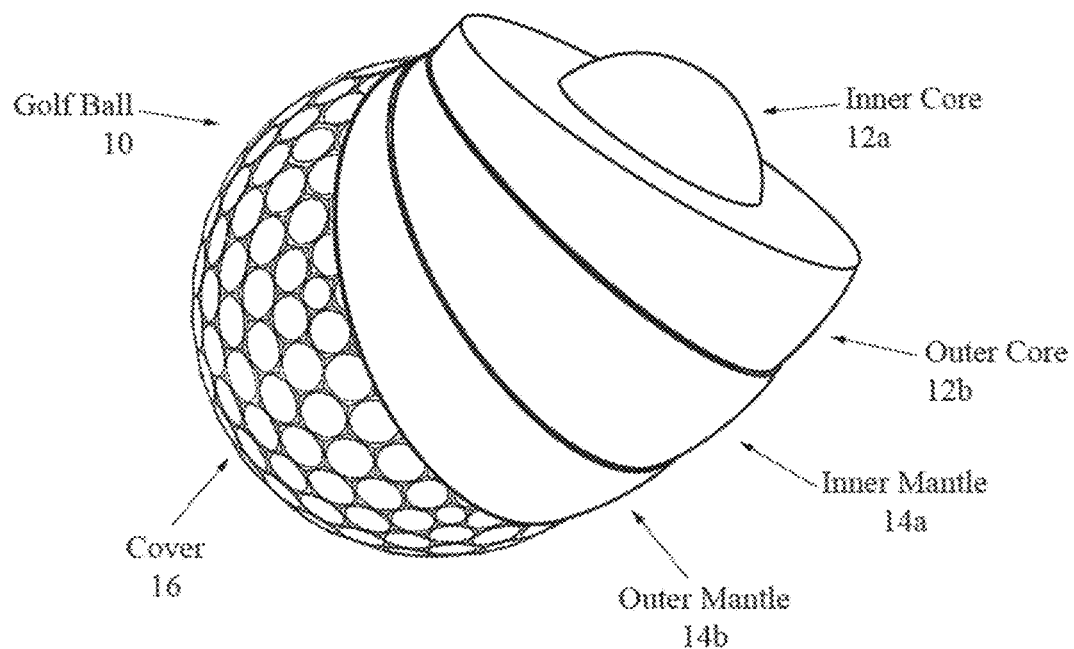
FIG. 1 is an exploded partial cut-away view of a golf ball.
Figure 2:
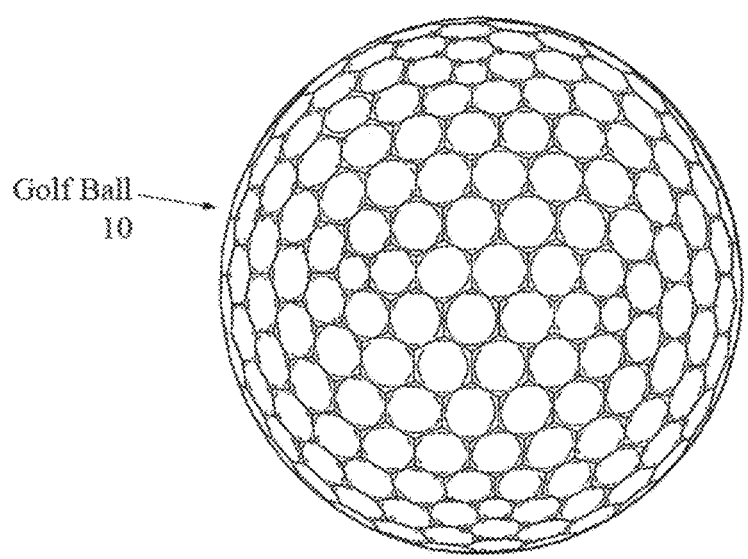
FIG. 2 is top perspective view of a golf ball.
Figure 3:
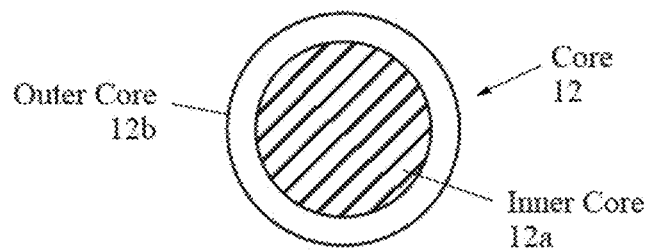
FIG. 3 is a cross-sectional view of a core component of a golf ball.
Figure 4:
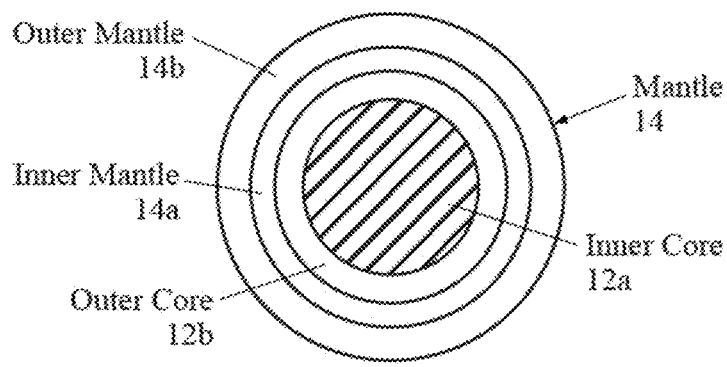
FIG. 4 is a cross-sectional view of a core component and a mantle component of a golf ball.

Since its discovery in 2004, graphene has attracted tremendous academic as well as industrial interest. It is 100 times stronger than steel, 50% electrically and 10 times thermally more conductive than copper. It also has one of the best-known gas barrier properties. Recently due to advances in its manufacturing process, cost of graphene has come down significantly. This reduced cost combined with its superior properties has resulted in many successful commercial products. Graphene in its oxidized form is called graphene oxide. Graphene oxide has more oxygen content than typical graphene. Graphene oxide can have various functional groups such as epoxy, hydroxyl, and carboxylic acid. All these groups due to their polar nature help with compatibility when dispersed in polymers with polar groups. In golf ball industry, such polymers include but are not limited to polyethylene ionomers (e.g. surlyn and HPF sold by DuPont or DowDuPont Inc.), EPDM rubber, polyamide, and thermoplastic or cast polyurethane. Polyethylene ionomers such as surlyn or HPF contain carboxylic acid groups that are fully or partially neutralized by cations. Graphene oxide due to presence of carboxylic acid groups can have a very good compatibility with such ionomers. Functional groups on graphene oxide can also improve compatibility with polyurethane by hydrogen bonding. Better compatibility helps in improving mechanical and barrier properties of mantle and cover.

Graphene oxide and/or graphene can be compounded with ionomers or polyurethane by using a twin-screw extruder. Other methods of incorporation such as injection molding, solvent blending, and two-roll milling are also possible. Graphene oxide and/or graphene can be used in powder or masterbatch form during injection molding mantle or cover.

Abrasion, impact resistance, durability, and barrier properties of mantle, and cover can be enhanced by incorporation of graphene oxide in these layers.

A golf ball cover consisting of thermoplastic or cast polyurethane, which is infused with graphene oxide and/or graphene. These additives can be present in 0.1 to 5% based on total weight of the polyurethane. Higher percentages although possible but not practical, may reduce the speed and increase hardness of the ball.

Optionally this ionomer can also contain graphene nanoplatelets, multi walled carbon nanotubes, boron nitride, and/or any combination of the above.

A golf ball with ionomer mantle or cover that is infused with graphene oxide and/or graphene. These additives can be present in 0.1 to 5% based on total weight of the ionomer. Higher percentages although possible but not practical, may reduce the speed and increase hardness of the ball.

Optionally this ionomer can also contain graphene nanoplatelets, multi walled carbon nanotubes, boron nitride, and/or any combination of the above.

One objective of the present invention is to improve durability of golf ball core by incorporation of graphene in either the core the impact strength of the ball. This benefit can be seen in either a ball designed to have a low compression single piece core, or a dual core with an outer core firmer than the inner core. Improved durability of the core or mantle composition by using graphene can result in higher mean time to fail (MTTF) upon repeated impact in a high speed testing device, or with a golf club in normal play.

Another objective of the present invention is to improve aging properties due to the incorporation of graphene in either the core or mantle layer for better retention of compression and COR over time.

Polybutadiene based cores were made using following materials. Corresponding levels (by % wt) is mentioned next to each material: Polybutadiene with more than 60% 1,4-cis structure—(40-90%); Polyisoprene—(1-30%); Zinc diacrylate—(10-50%); Zinc oxide—(1-30%); Zinc stearate—(1-20%); Peroxide initiator—(0.1-10%); Zinc pentachlorothiophenol—(0-10%); Color—(0-10%); Barium sulfate—(0-20%); Graphene A (0.01-6%)—is available from various suppliers such as Cheap Tubes Inc., Ad-Nano Technologies Private Limited, MKnano, XG Sciences Inc., Angstron Materials Inc. (graphene A may have an average surface area between 15-50 $m^2/g$); Graphene B (0.01-6%)—is available from various suppliers such as Cheap Tubes Inc., Ad-Nano Technologies Private Limited, MKnano, XG Sciences Inc., Angstron Materials Inc. (graphene B may have an average surface area between 300-400 $m^2/g$); Graphene C (0.01-6%)—is available from various suppliers such as Cheap Tubes Inc., Ad-Nano Technologies Private Limited, MKnano, XG Sciences Inc., Angstron Materials Inc. (graphene C has a higher surface average than either graphene A or graphene B, and graphene C may have an average surface area between 400-800 $m^2/g$); Graphene masterbatch (a masterbatch of 90-99% polybutadiene or polyisoprene and 1-10% graphene)-(0.1-50%)-custom compounding can be done with the help of various suppliers such as Preferred Compounding Corp, Dyna-Mix, Alttran, Callaway (in house compounding).

Four different single cores (formula 1 to 4) were made as shown in recipe in Table 1. Control group (formula 1) had no graphene design will also experience a dramatic increase in crack durability based on this improvement to the core.

Dual Cores with graphene A only in the outer core.

In this study graphene A was introduced to the outer core in a dual core construction. Dual cores were made by compression molding two outer core halves around an already molded inner core having a diameter of approximately 0.940" and a soft compression of approximately 0.200 inches of deflection under a 200 lb load. Curing of the inner and outer core was done at temperatures ranging between 150-400° F. for times ranging from 1-30 minutes. After molding, the dual cores were spherically ground to approximately 1.554" prior to testing.

Table 2 and 3 give details of recipe of inner and outer cores. Components from these recipes were mixed in an internal mixer. Optionally, additional mixing was done using a two roll mill.

Compression of the outer core is measured by first making a full size core separately, measuring its compression, and then molding two halves around the inner core to complete the dual core.

Compression differential describes the difference between the outer core compression (as molded independently) and inner core compression. A higher compression differential is more susceptible to crack durability upon impact.

TABLE 1

Recipe of solid core (graphene)

| Components | Formula 1 (0% Graphene A) % wt | Formula 2 (0.4% Graphene A) % wt | Formula 3 (0.8% Graphene A) % wt | Formula 4 (1.6% Graphene A) % wt |
|---|---|---|---|---|
| Polybutadiene | 62.5 | 62.3 | 62.1 | 61.5 |
| Zinc Diacrylate | 19.9 | 19.8 | 19.7 | 19.6 |
| Zinc Oxide | 6.3 | 6.2 | 6.2 | 6.2 |
| Zinc Stearate | 3.8 | 3.7 | 3.7 | 3.7 |
| Peroxide initiator | 0.5 | 0.5 | 0.5 | 0.5 |
| Zinc pentachlorothiophenol | 0.6 | 0.6 | 0.6 | 0.6 |
| Color | 0.1 | 0.1 | 0.1 | 0.1 |
| Limestone | 0.0 | 0.0 | 0.0 | 0.0 |
| Tungsten | 0.0 | 0.0 | 0.0 | 0.0 |
| Barium sulfate | 6.4 | 6.4 | 6.4 | 6.3 |
| Graphene A | 0.0 | 0.4 | 0.8 | 1.6 |
| Graphene A in masterbatch | 0.0 | 0.0 | 0.0 | 0.0 |
| Properties of core | | | | |
| Compression | 69.4 | 74.3 | 74.6 | 76.4 |
| COR (coefficient of restitution @125 fps) | 0.801 | 0.800 | 0.795 | 0.790 |
| Durability score or mean time to fail MTTF(number of shots after which ball starts to crack/fail) | 34 | 60 | 47 | 62 |

Compression is measured by applying a 200 pound load to the core and measuring its deflection, in inches. Compression=180−(deflection*1000).

Durability Testing of Solid Cores

Cores were shot at 150 fps in a pneumatic testing machine (PTM).

Figure 20:
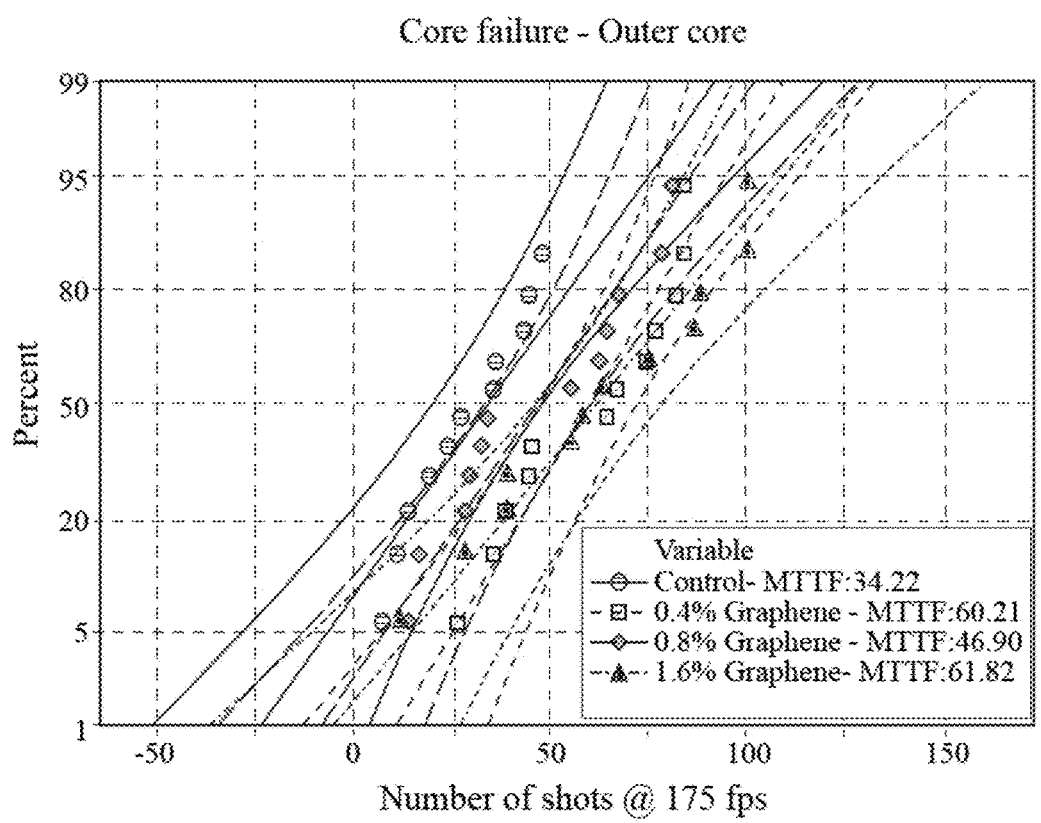
FIG. 20 is a graph of durability testing of outer cores using PTM at 175 fps.

For each formula mentioned in Table 1, twelve cores were tested. The number of shots after which each core cracked was recorded for each core, and the cracked core was removed from the remainder of the test. The data was reported using a Weibull plot, and the mean time to fail was reported as shown in Table 1. As seen in FIG. 20, graphene modified cores endured more shots before failure compared to cores with no graphene. It is reasonable to assume that the durability of a golf ball having a single piece core of this

TABLE 2

Inner core recipe

| Components | % wt |
|---|---|
| Polybutadiene rubber | 69.2 |
| Polyisoprene rubber | 0.0 |
| Zinc diacrylate | 14.8 |
| Zinc oxide | 12.2 |
| Zinc stearate | 2.1 |
| Peroxide initiator | 1.0 |
| Zinc pentachlorothiophenol | 0.6 |
| Color | 0.1 |

TABLE 2-continued

Inner core recipe

| Components | % wt |
|---|---|
| Barium sulfate | 0.0 |
| Graphene A | 0.0 |
| graphene A masterbatch | 0.0 |
| Properties | |
| Compression | 0.220 |

TABLE 3

Outer core recipe of dual core

| Components | Formula 5 (0% Graphene) % wt | Formula 6 (0.4% Graphene) % wt | Formula 7 (0.8% Graphene) % wt | Formula 8 (1.6% Graphene) % wt |
|---|---|---|---|---|
| Polybutadiene | 62.5 | 62.3 | 62.1 | 61.5 |
| Zinc Diacrylate | 19.9 | 19.8 | 19.7 | 19.6 |
| Zinc Oxide | 6.3 | 6.2 | 6.2 | 6.2 |
| Zinc Stearate | 3.8 | 3.7 | 3.7 | 3.7 |
| Peroxide initiator | 0.5 | 0.5 | 0.5 | 0.5 |
| Zinc pentachloro-thiophenol | 0.6 | 0.6 | 0.6 | 0.6 |
| Color | 0.1 | 0.1 | 0.1 | 0.1 |
| Limestone | 0.0 | 0.0 | 0.0 | 0.0 |
| Tungsten | 0.0 | 0.0 | 0.0 | 0.0 |
| Barium sulfate | 6.4 | 6.4 | 6.4 | 6.3 |
| Graphene A | 0.0 | 0.4 | 0.8 | 1.6 |
| Graphene A in masterbatch | 0.0 | 0.0 | 0.0 | 0.0 |
| Properties of outer core | | | | |
| Compression | 69.4 | 74.3 | 74.6 | 76.4 |
| COR (coefficient of restitution) | 0.801 | 0.800 | 0.795 | 0.790 |
| Properties of dual core built from inner and outer core | | | | |
| Compression | 48.9 | 50.9 | 52.1 | 54.1 |
| COR (coefficient of restitution @125 fps) | 0.796 | 0.795 | 0.793 | 0.790 |
| Durability score or mean time to fail MTTF (number of shots after which ball starts to crack/fail) | 50 | 60 | 52 | 57 |

Compression is measured by applying a 200 pound load to the core and measuring its deflection, in inches. Compression=180−(deflection*1000)

Durability Testing of Dual Cores

Cores were shot at 175 fps in a pneumatic testing machine (PTM).

Figure 21:
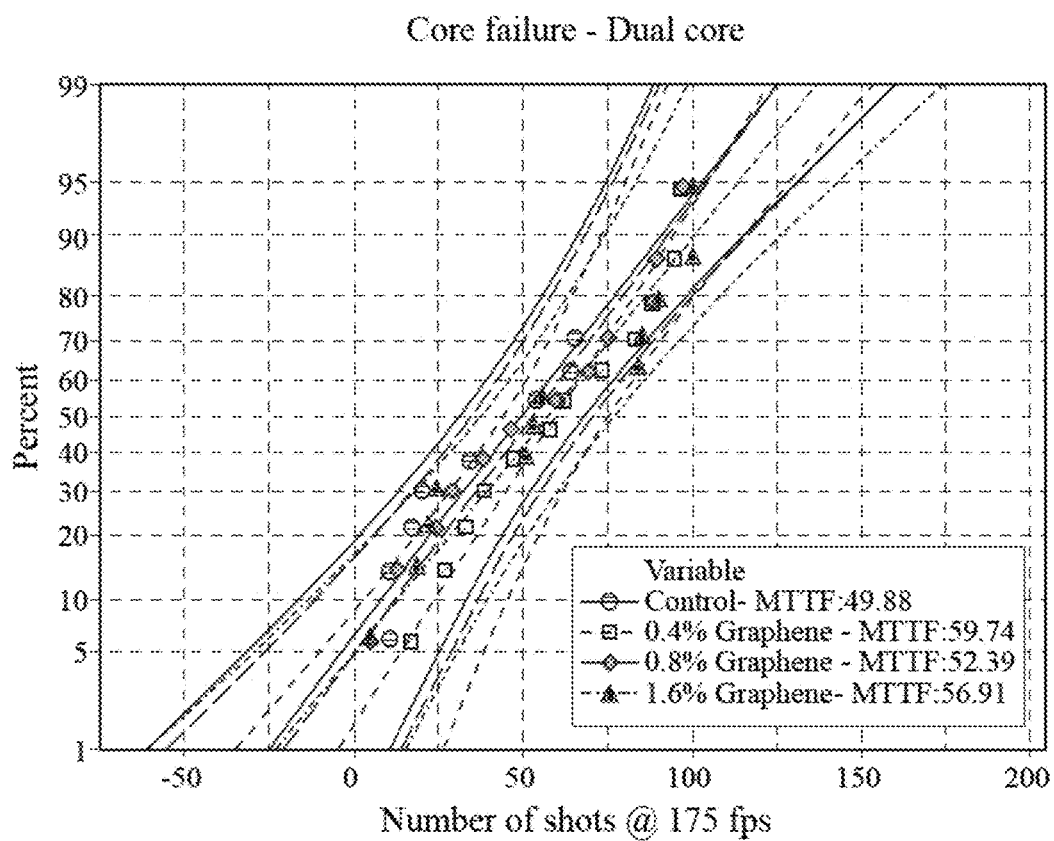
FIG. 21 is a graph of durability testing of dual cores using PTM at 175 fps.

For each formula mentioned in Table 3, twelve cores were tested. The number of shots after which each core cracked was recorded for each core, and the cracked core was removed from the remainder of the test. The data was reported using a Weibull plot, and the mean time to fail was reported as shown in Table 3. As seen in FIG. 21, graphene modified cores endured more shots before failure compared to cores with no graphene. It is reasonable to assume that the durability of a golf ball having a dual core of this design will also experience a dramatic increase in crack durability based on this improvement to the dual core. It's reasonable to assume that the addition of graphene in the inner core could provide a durability enhancement to the overall golf ball, but this study only focused on the outer core.

Dual Cores with Graphene-C in Outer Core Only

In this study Graphene-C (0.01-6%, available from various suppliers such as Cheap Tubes Inc., Ad-Nano Technologies Private Limited, MKnano, XG Sciences Inc., Angstron Materials Inc., and has an average surface area between 400-800 m$^2$/g) was introduced to the outer core in a dual core construction. Dual cores were made by compression molding two outer core halves around an already molded inner core having a diameter of approximately 0.940" and a soft compression of approximately 0.200 inches of deflection under a 200 lb load. Curing of the inner and outer core was done at temperatures ranging between 150-400 F for times ranging from 1-30 minutes. After molding, the dual cores were spherically ground to approximately 1.554" prior to testing.

Tables 4 and 5 give details of recipe of inner and outer cores. Components from these recipes were mixed in an internal mixer. Optionally, additional mixing was done using a two roll mill.

Compression of the outer core is measured by first making a full size core separately, measuring its compression, and then molding two halves around the inner core to complete the dual core. Compression differential describes the difference between the outer core compression (as molded independently) and inner core compression. A higher compression differential is more susceptible to crack durability upon impact.

TABLE 4

Inner core recipe

| Components | % wt |
|---|---|
| Polybutadiene rubber | 69.2 |
| Polyisoprene rubber | 0.0 |
| Zinc diacrylate | 14.8 |
| Zinc oxide | 12.2 |
| Zinc stearate | 2.1 |
| Peroxide initiator | 1.0 |
| Zinc pentachlorothiophenol | 0.6 |
| Color | 0.1 |
| Barium sulfate | 0.0 |
| Graphene-C | 0.0 |
| Graphene-C masterbatch | 0.0 |
| Properties | |
| Compression | 0.220 inch under 200 lb load |

TABLE 5

Outer recipe of dual core

| Components | Formula 9 (0% Graphene C) % wt | Formula 10 (0.4% Graphene C) % wt | Formula 11 (0.8% Graphene C) % wt | Formula 12 (1.6% Graphene C) % wt |
|---|---|---|---|---|
| Polybutadiene | 62.5 | 62.3 | 62.0 | 61.6 |
| Zinc Diacrylate | 19.9 | 19.8 | 19.7 | 19.6 |
| Zinc Oxide | 6.3 | 6.2 | 6.2 | 6.2 |

TABLE 5-continued

| | Outer recipe of dual core | | | |
|---|---|---|---|---|
| Components | Formula 9 (0% Graphene C) % wt | Formula 10 (0.4% Graphene C) % wt | Formula 11 (0.8% Graphene C) % wt | Formula 12 (1.6% Graphene C) % wt |
| Zinc Stearate | 3.8 | 3.7 | 3.7 | 3.7 |
| Peroxide initiator | 0.5 | 0.5 | 0.5 | 0.5 |
| Zinc pentachlorothiophenol | 0.6 | 0.6 | 0.6 | 0.6 |
| Color | 0.1 | 0.1 | 0.1 | 0.1 |
| Limestone | 0.0 | 0.0 | 0.0 | 0.0 |
| Tungsten | 0.0 | 0.0 | 0.0 | 0.0 |
| Barium sulfate | 6.4 | 6.4 | 6.4 | 6.3 |
| Graphene-2 | 0.0 | 0.4 | 0.8 | 1.6 |
| Graphene-2 in masterbatch | 0.0 | 0.0 | 0.0 | 0.0 |
| Properties of outer core | | | | |
| Compression | 67.0 | 69.1 | 68.8 | 70.8 |
| COR (coefficient of restitution) | 0.801 | 0.798 | 0.795 | 0.791 |
| Core Stiffness/Flexural Modulus in MPa (measured on dog bone shape cured core) | 97.1 | 91.3 | 94.6 | 81.9 |
| Tensile modulus of the core in MPa (measured on a dog bone shaped cured core) | 8.5 | 9.7 | 9.6 | 8.3 |
| Properties of dual core built from inner and outer core | | | | |
| Compression | 45.0 | 48.9 | 48.6 | 50.4 |
| COR (coefficient of restitution @125 fps) | 0.795 | 0.794 | 0.793 | 0.789 |
| Durability score or mean time to fail MTTF(number of shots after which ball starts to crack/fail) | 33 | 67 | 78 | 99 |

Compression is measured by applying a 200 pound load to the core and measuring its deflection, in inches. Compression=180−(deflection*1000).

Durability Testing of Dual Cores

Cores were shot at 175 fps in a pneumatic testing machine (PTM).

Figure 22:
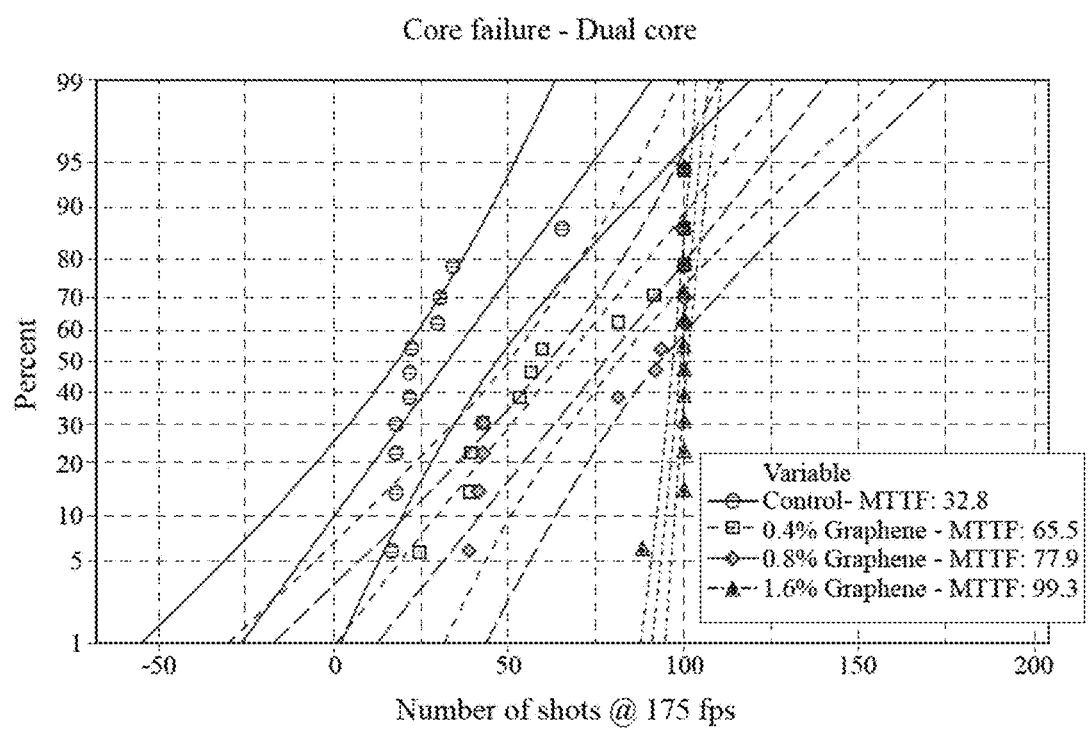
FIG. 22 is a graph of durability testing of dual cores using PTM at 175 fps.

For each formula mentioned in Table 5, twelve cores were tested. The number of shots after which each core cracked was recorded for each core, and the cracked core was removed from the remainder of the test. The data was reported using a Weibull plot, and the mean time to fail was reported as shown in Table 5. Testing was stopped after 100 shots. As shown in FIG. 22, graphene modified cores endured more shots before failure compared to cores with no graphene. It is reasonable to assume that the durability of a golf ball having a dual core of this design will also experience a dramatic increase in crack durability based on this improvement to the dual core. It's reasonable to assume that the addition of graphene in the inner core could provide a durability enhancement to the overall golf ball, but this study only focused on the outer core.

Dual Cores with Graphene A in the Inner Core and the Outer Core.

In this study graphene A was introduced to the inner and outer core in a dual core construction. Table 6 gives details of recipe of inner and outer cores of these dual cores. Components from these recipes were mixed in an internal mixer. Optionally, additional mixing was done using a two roll mill. Dual cores were made by compression molding two outer core halves around an already molded inner core having a diameter of approximately 0.940" and a soft compression of approximately 0.200 inches of deflection under a 200 lb load. Curing of the inner and outer core was done at temperatures ranging between 150-400 F for times ranging from 1-30 minutes. After molding, the dual cores were spherically ground to approximately 1.554" prior to testing.

Compression of the outer core was measured by first making a full size core separately, measuring its compression, and then molding two halves around the inner core to complete the dual core.

TABLE 6

| | Dual core recipes with graphene A in the inner core and the outer core | | | |
|---|---|---|---|---|
| Components | Formula 13- inner core % wt | Formula 14- inner core % wt | Formula 15- inner core % wt | Formula 16- inner core % wt |
| Polybutadiene | 69.2 | 69.2 | 69.1 | 68.9 |
| Zinc Diacrylate | 14.8 | 14.8 | 14.7 | 14.7 |
| Zinc Oxide | 12.3 | 12.3 | 12.2 | 12.2 |
| Zinc Stearate | 2.1 | 2.1 | 2.1 | 2.1 |
| Peroxide initiator | 1.0 | 1.0 | 1.0 | 1.0 |
| Zinc pentachlorothiophenol | 0.6 | 0.6 | 0.6 | 0.6 |

TABLE 6-continued

Dual core recipes with graphene A in the inner core and the outer core

| | | | | |
|---|---|---|---|---|
| Color | 0.0 | 0.0 | 0.0 | 0.0 |
| Limestone | 0.0 | 0.0 | 0.0 | 0.0 |
| Tungsten | 0.0 | 0.0 | 0.0 | 0.0 |
| Barium sulfate | 0.0 | 0.0 | 0.0 | 0.0 |
| Graphene A | 0.0 | 0.0 | 0.2 | 0.4 |
| Properties of inner core | | | | |
| Compression | 0.221 | 0.221 | 0.219 | 0.217 |

| Components | Formula 13-outer core % wt | Formula 14-outer core % wt | Formula 15-outer core % wt | Formula 16-outer core % wt |
|---|---|---|---|---|
| Polybutadiene | 62.5 | 62.3 | 62.3 | 62.3 |
| Zinc Diacrylate | 19.9 | 19.8 | 19.8 | 19.8 |
| Zinc Oxide | 6.2 | 6.2 | 6.2 | 6.2 |
| Zinc Stearate | 3.7 | 3.7 | 3.7 | 3.7 |
| Peroxide initiator | 0.5 | 0.5 | 0.5 | 0.5 |
| Zinc pentachlorothiophenol | 0.6 | 0.6 | 0.6 | 0.6 |
| Color | 0.1 | 0.0 | 0.0 | 0.0 |
| Limestone | 0.0 | 0.0 | 0.0 | 0.0 |
| Tungsten | 0.0 | 0.0 | 0.0 | 0.0 |
| Barium sulfate | 6.5 | 6.5 | 6.5 | 6.5 |
| Graphene A | 0.0 | 0.4 | 0.4 | 0.4 |
| Properties of outer core | | | | |
| Compression | 67.8 | 67.6 | 67.6 | 67.6 |
| COR (coefficient of restitution @125 fps) | 0.800 | 0.796 | 0.796 | 0.796 |
| Properties of dual core built from inner and outer core | | | | |
| Compression | 47.3 | 48.1 | 49.0 | 48.3 |
| COR (coefficient of restitution @125 fps) | 0.795 | 0.793 | 0.793 | 0.792 |
| Durability score or mean time to fail MTTF(number of shots after which ball starts to crack/fail) | 29 | 24 | 33 | 40 |

Compression is measured by applying a 200 pound load to the core and measuring its deflection, in inches. Compression=180−(deflection*1000).

Figure 23:
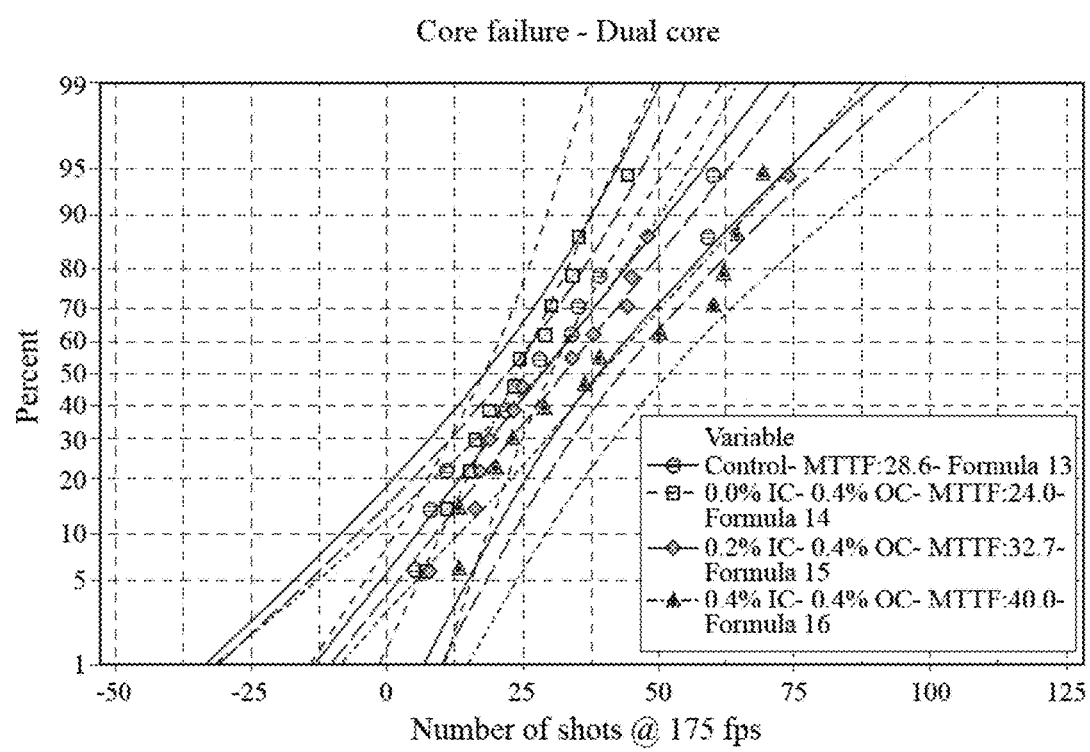
FIG. 23 is a graph of durability testing of dual cores using PTM at 175 fps.
Figure 24:
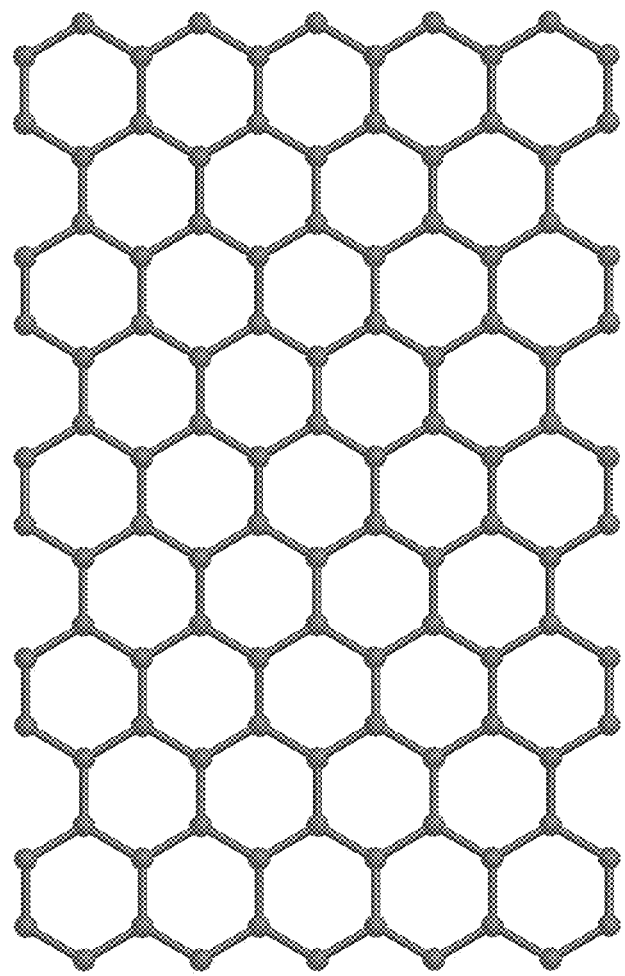
FIG. 24 is an illustration of graphene.

For each formula mentioned in Table 6, twelve cores were tested. The number of shots after which each core cracked was recorded for each core, and the cracked core was removed from the remainder of the test. The data was reported using a Weibull plot, and the mean time to fail was reported as shown in Table 6. As seen in FIG. 23, graphene modified cores endured more shots before failure compared to cores with no graphene. The best durability was observed for balls which had graphene in inner and outer cores. It is reasonable to assume that the durability of a golf ball having a dual core of this design will also experience a dramatic increase in crack durability based on this improvement to the dual core. It's reasonable to assume that the addition of graphene in the inner core could provide a durability enhancement to the overall golf ball, but this study only focused on the outer core.

Dual Cores with Graphene B in the Outer Core Only

In this study Graphene-B was introduced to the outer core in a dual core construction. Dual cores were made by compression molding two outer core halves around an already molded inner core having a diameter of approximately 0.940" and a soft compression of approximately 0.200 inches of deflection under a 200 lb load. Curing of the inner and outer core was done at temperatures ranging between 150-400 F for times ranging from 1-30 minutes. After molding, the dual cores were spherically ground to approximately 1.554" prior to testing.

Tables 7 and 8 give details of recipe of inner and outer cores. Components from these recipes were mixed in an internal mixer. Optionally, additional mixing was done using a two roll mill.

Compression of the outer core is measured by first making a full size core separately, measuring its compression, and then molding two halves around the inner core to complete the dual core. Compression differential describes the difference between the outer core compression (as molded independently) and inner core compression. A higher compression differential is more susceptible to crack durability upon impact.

TABLE 7

Inner Core Recipe

| Components | % wt |
|---|---|
| Polybutadiene rubber | 69.2 |
| Polyisoprene rubber | 0.0 |
| Zinc diacrylate | 14.8 |
| Zinc oxide | 12.2 |
| Zinc stearate | 2.1 |
| Peroxide initiator | 1.0 |

TABLE 7-continued

Inner Core Recipe

| Components | % wt |
|---|---|
| Zinc pentachlorothiophenol | 0.6 |
| Color | 0.1 |
| Barium sulfate | 0.0 |
| Graphene-B | 0.0 |
| Graphene-B masterbatch | 0.0 |
| Properties | |
| Compression | 0.223 inch under 200 lb load |

TABLE 8

Outer Core Recipe Of Dual Core

| Components | Formula 17 % wt | Formula 18 % wt | Formula 19 % wt |
|---|---|---|---|
| Polybutadiene | 62.5 | 62.0 | 61.6 |
| Zinc Diacrylate | 19.9 | 19.7 | 19.6 |
| Zinc Oxide | 6.3 | 6.2 | 6.2 |
| Zinc Stearate | 3.8 | 3.7 | 3.7 |
| Peroxide Initiator | 0.5 | 0.5 | 0.5 |
| Zinc Pentachlorothiophenol | 0.6 | 0.6 | 0.6 |
| Color | 0.1 | 0.1 | 0.1 |
| Limestone | 0 | 0 | 0 |
| Tungsten | 0 | 0 | 0 |
| Barium Sulfate | 6.4 | 6.4 | 6.3 |
| Graphene B | 0 | 0.8 | 1.6 |
| Graphene B Masterbatch | 0 | 0 | 0 |

The compression of Formula 17 is 64.3, the compression of Formula 18 is 68.0, and the compression of Formula 19 is 67.1. The compression of a dual core built from the inner core and the outer core is 42.1 for Formula 17, 45.8 for Formula 18 and 48.7 for Formula 19. Compression is measured by applying a 200 pound load to the core and measuring its deflection, in inches. Compression=180−(deflection*1000).

Durability Testing of Dual Cores

Cores were shot at 175 fps in a pneumatic testing machine (PTM).

Figure 25:
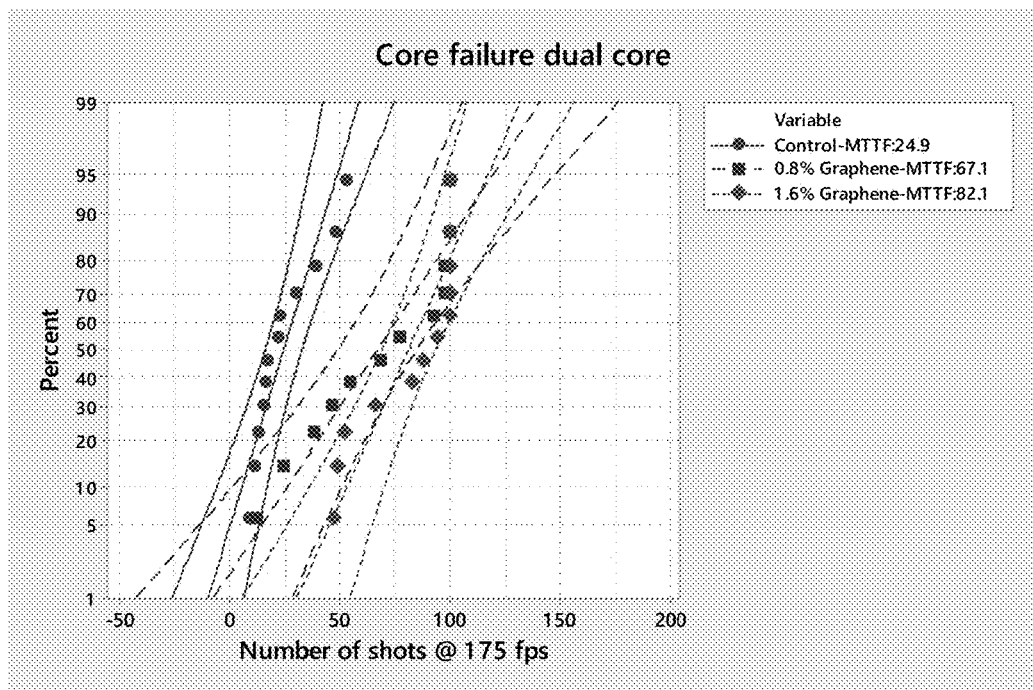
FIG. 25 is a graph of durability testing of dual cores using PTM at 175 fps.

For each formula mentioned in Table 8, twelve cores were tested. The number of shots after which each core cracked was recorded for each core, and the cracked core was removed from the remainder of the test. The data was reported using a Weibull plot, and the mean time to fail was reported as shown in Table 8. Testing was stopped after 100 shots. As seen in FIG. 25, graphene modified cores endured more shots before failure compared to cores with no graphene. It is reasonable to assume that the durability of a golf ball having a dual core of this design will also experience a dramatic increase in crack durability based on this improvement to the dual core. It's reasonable to assume that the addition of graphene in the inner core could provide a durability enhancement to the overall golf ball, but this study only focused on the outer core.

Effect of Average Surface Area on Durability of Dual Core.

Figure 26:
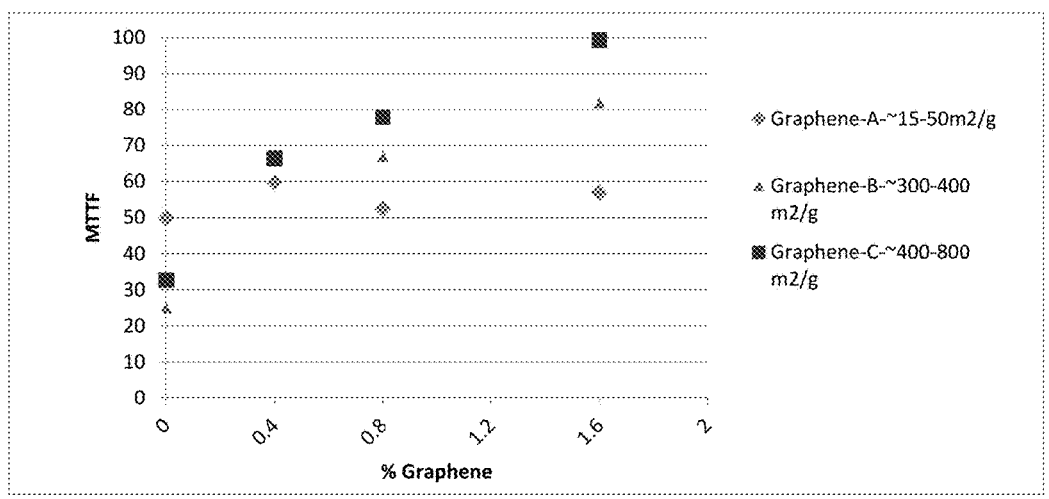
FIG. 26 is a durability plot (MTTF) vs average surface area of graphene.

As seen in Table 9 and FIG. 26, as the average surface area of graphene nanoplatelet increases, mean time to fail (MTTF) or durability increases. For the same concentration of graphene, nanoplatelet that has higher average surface area lasts longer in a typical durability test.

TABLE 9

Durability comparison of graphene with different average surface areas

| | Control | 0.4% Graphene-A | 0.8% Graphene-A | 1.6% Graphene-A | Control | 0.8% Graphene-B | 1.6% Graphene-B | Control | 0.4% Graphene-C | 0.8% Graphene-C | 1.6% Graphene-C |
|---|---|---|---|---|---|---|---|---|---|---|---|
| Graphene Type | Graphene A | Graphene A | Graphene A | Graphene A | Graphene B | Graphene B | Graphene B | Graphene C | Graphene C | Graphene C | Graphene C |
| Average surface area (m2/g) | ~15-50 | ~15-50 | ~15-50 | ~15-50 | ~300-400 | ~300-400 | ~300-400 | ~400-800 | ~400-800 | ~400-800 | ~400-800 |
| Reference table | Table 3 | Table 3 | Table 3 | Table 3 | Table 8 | Table 8 | Table 8 | Table 5 | Table 5 | Table 5 | Table 5 |
| Properties of dual core | | | | | | | | | | | |
| Dual core compression | 48.9 | 50.9 | 52.1 | 54.1 | 42.1 | 45.8 | 48.7 | 45.0 | 48.9 | 48.6 | 50.4 |
| Dual core COR | 0.796 | 0.795 | 0.793 | 0.790 | 0.793 | 0.790 | 0.787 | 0.795 | 0.794 | 0.793 | 0.789 |
| Dual core MTTF | 50 | 60 | 52 | 57 | 25 | 67 | 82 | 33 | 67 | 78 | 99 |

Improvement in Curing by Addition of Graphene

Figure 27:
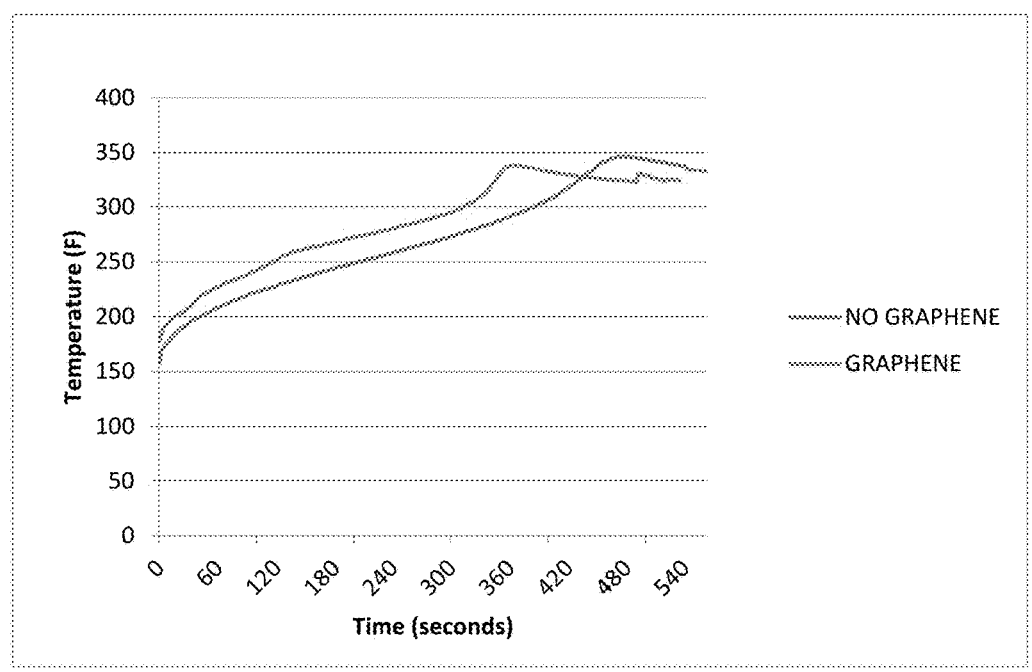
FIG. 27 is a graph of temperature of an outer core of a dual core as a function of cure time.

To test if graphene helps reduce the time required to cure a given rubber core, temperature/time experiment was conducted. Controlled cores had no graphene whereas modified cores contained 1.6% graphene in an outer core. Inner cores did not have any graphene. A thermocouple was attached to an outer core of the dual core. Temperature of outer core was recorded while curing the dual core. Temperature inside outer core of a dual core was recorded as a function of time as shown in FIG. 27. As seen in FIG. 27, cores that contain graphene achieve a maximum temperature sooner than cores that do not contain graphene. This can be attributed to a higher thermal conductivity of graphene that causes the outer core to reach higher temperature faster than cores that do not have any graphene.

Novelty of this process: Durability of the dual core with a high compression differential is greatly enhanced by incorporation of graphene in inner and outer core. The graphene reinforcement to the inner and outer core helps resist the high stresses experienced by the core when struck at high club speeds. Addition of graphene to the core recipe is very simple and it can be dispersed into the polybutadiene mixture during two roll milling process. Due to high thermal conductivity of graphene, overall thermal conductivity of cores can be increased with incorporation of graphene. With higher thermal conductivity of graphene reinforced cores, curing cycles can be made shorter. Shorter curing cycles can lead to higher output in production. Optionally, graphene can be introduced as a masterbatch in polybutadiene or polyisoprene, making its dispersion into polybutadiene rubber much easier and dust free.

Dual Core

As our experiment has shown, incorporating graphene into the inner and outer core recipe reinforces the strength of the outer core and provides greater crack durability protection in the design of a dual core golf ball, which is more susceptible to crack durability failures if the outer core is much firmer than the soft inner core.

In general, this is applicable when the inner core is softer than the outer core. More specifically, when the inner core has more than 0.200" deflection under a 200 lb load, and the dual core is 40 compression or greater.

This is particularly crucial if the ball is a 4-piece construction with a single mantle layer with thickness less than 0.050", or more specifically thinner than 0.040", with 0.036" being the target in this study.

FIGS. 1, 3, 4 and 5 illustrate a five piece golf ball 10 comprising an inner core 12a, an outer core 12b, an inner mantle 14a, an outer mantle 14b, and a cover 16, wherein the cover layer 16 is composed of a thermoplastic polyurethane and has a Shore A hardness less than 90. The inner mantle layer 14a comprises an ionomer material and a graphene material in an amount ranging from 0.1 to 5.0 weight percent of the inner mantle layer.

Figure 5:
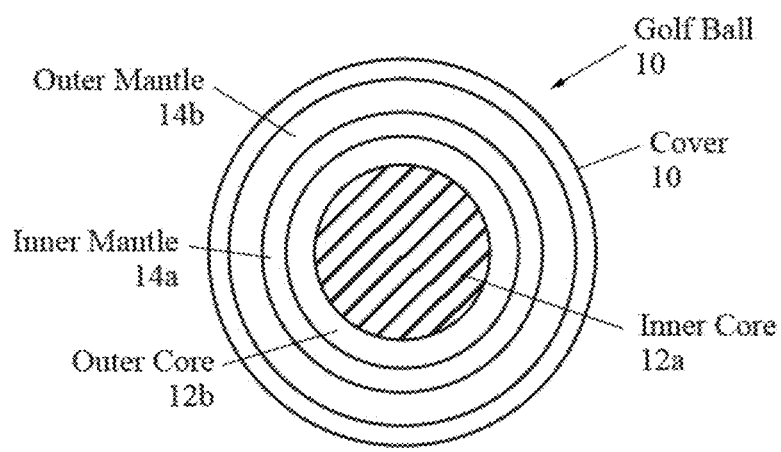
FIG. 5 is a cross-sectional view of an inner core layer, an outer core layer, an inner mantle layer, an outer mantle layer and a cover layer of a golf ball.
Figure 5A:
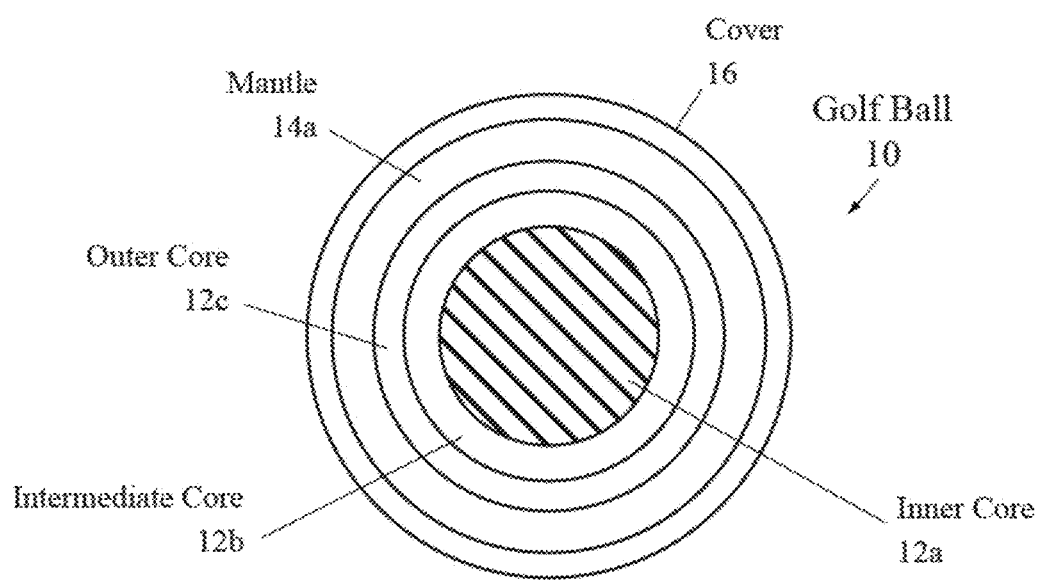
FIG. 5A is a cross-sectional view of an inner core layer, an intermediate core layer, an outer core layer, a mantle layer and a cover layer of a golf ball.

FIG. 5A illustrates a five piece golf ball 10 comprising an inner core 12a, an intermediate core 12b, an outer core 12c, a mantle 14, and a cover 16, wherein the cover layer 16 is composed of a thermoplastic polyurethane. The mantle layer 14 comprises an ionomer material and a graphene material in an amount ranging from 0.1 to 5.0 weight percent of the mantle layer.

Figure 8:
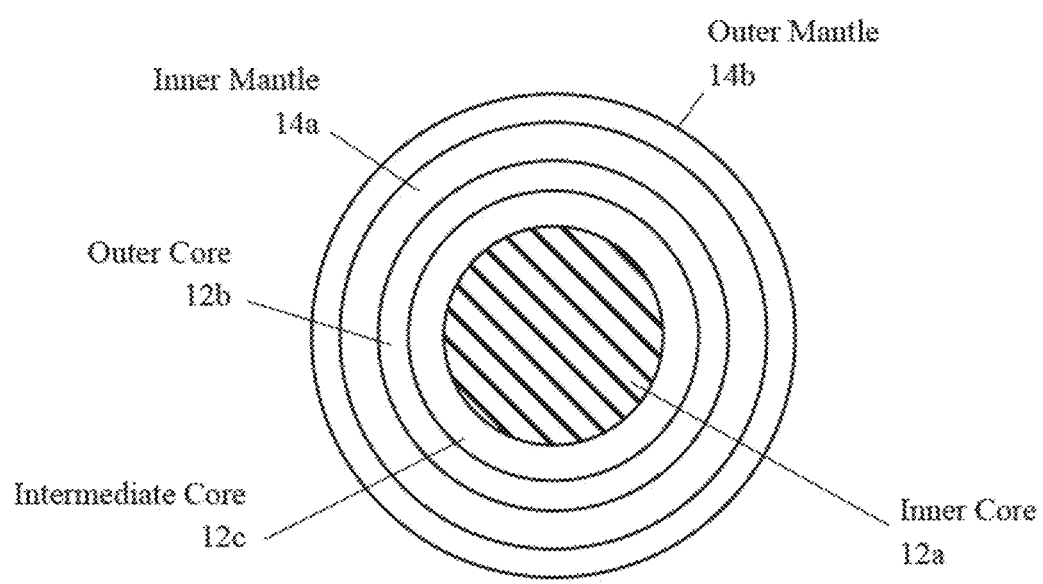
FIG. 8 is a cross-sectional view of a core component and a mantle component of a golf ball.
Figure 9:
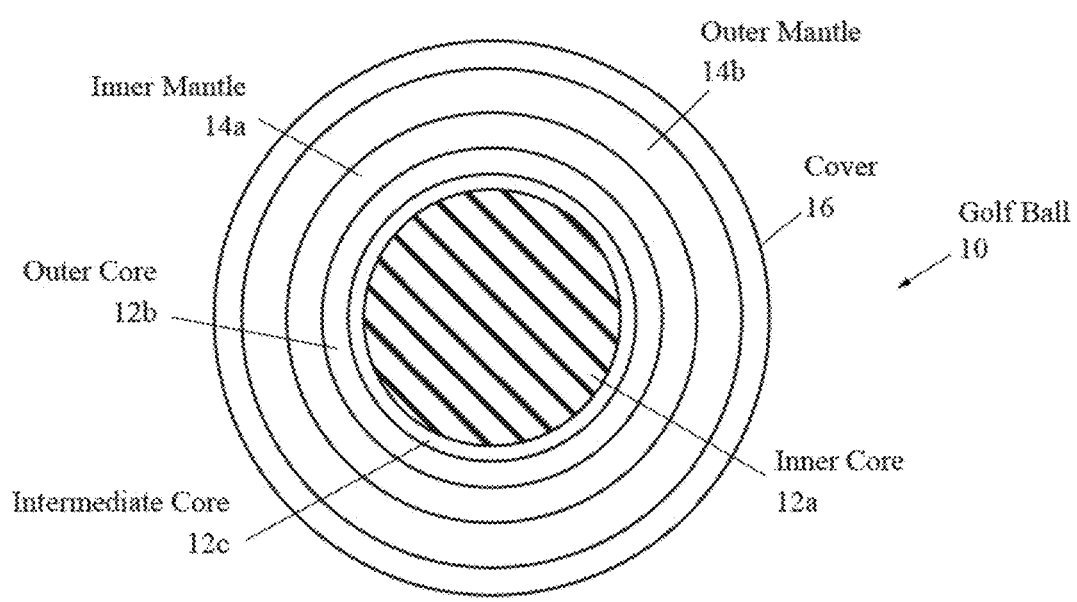
FIG. 9 is a cross-sectional view of a core component, the mantle component and a cover layer of a golf ball.

FIGS. 8 and 9 illustrate a six piece golf ball 10 comprising an inner core 12a, an intermediate core 12b, an outer core 12c, an inner mantle 14a, an outer mantle 14b, and a cover 16, wherein the cover layer 16 is composed of a thermoplastic polyurethane. The outer mantle layer 14b comprises an ionomer material and a graphene material in an amount ranging from 0.1 to 5.0 weight percent of the outer mantle layer.

Figure 10:
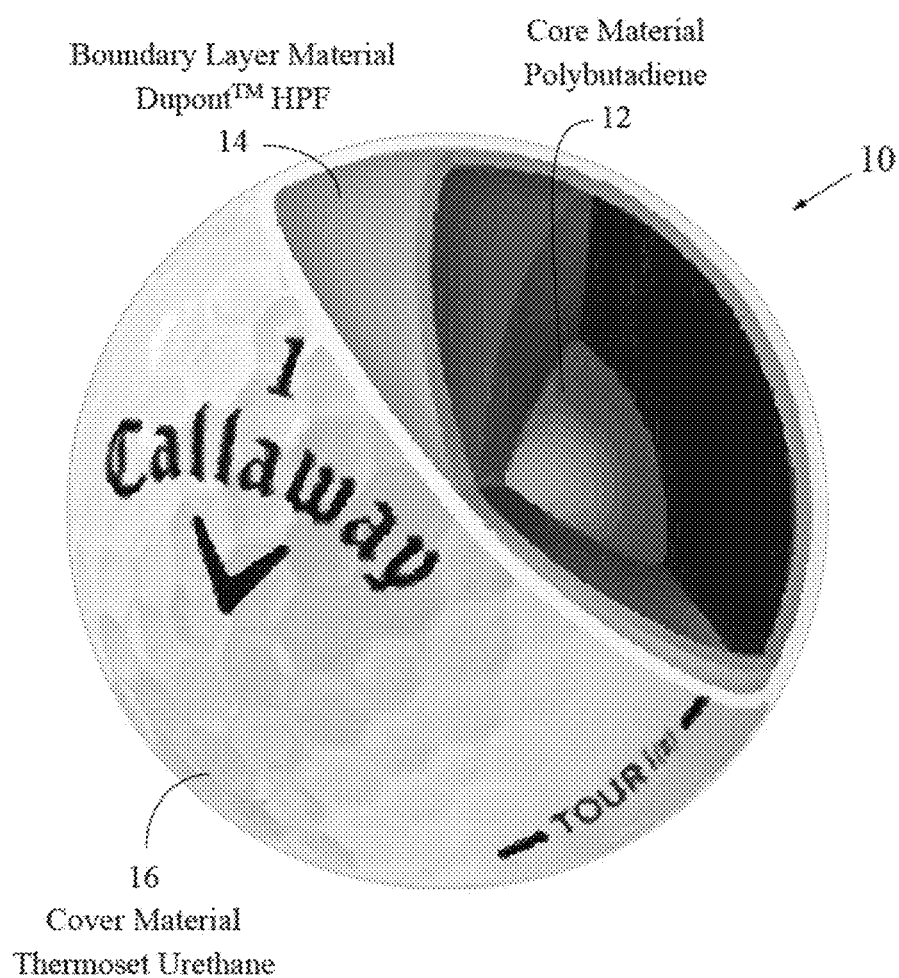
FIG. 10 is an exploded partial cut-away view of a four-piece golf ball.

FIG. 10 illustrates a four piece golf ball comprising a dual core, a boundary layer and a cover. The boundary layer comprises an ionomer material and a graphene material in an amount ranging from 0.1 to 5.0 weight percent of the boundary layer.

Figure 11:
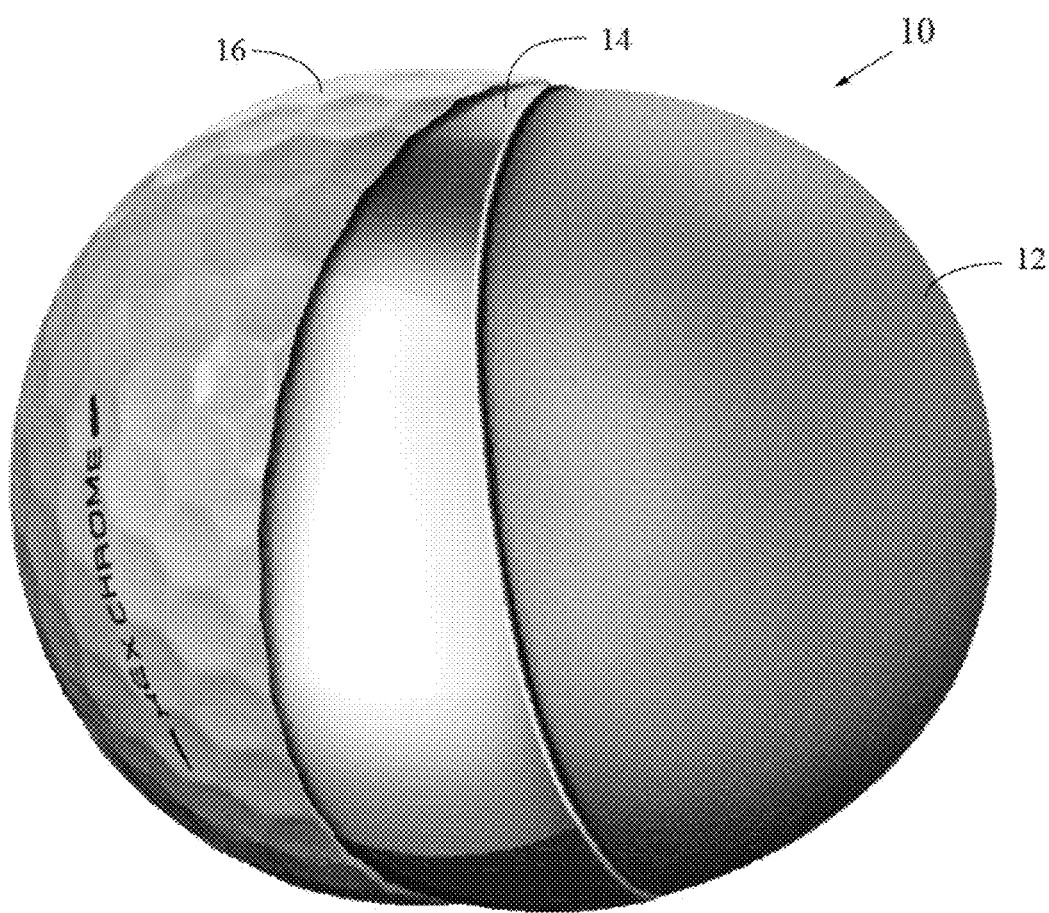
FIG. 11 is an exploded partial cut-away view of a three-piece golf ball.

FIG. 11 illustrates a three piece golf ball comprising a core, a boundary layer and a cover. The boundary layer comprises an ionomer material and a graphene material in an amount ranging from 0.1 to 5.0 weight percent of the boundary layer.

Figure 12:
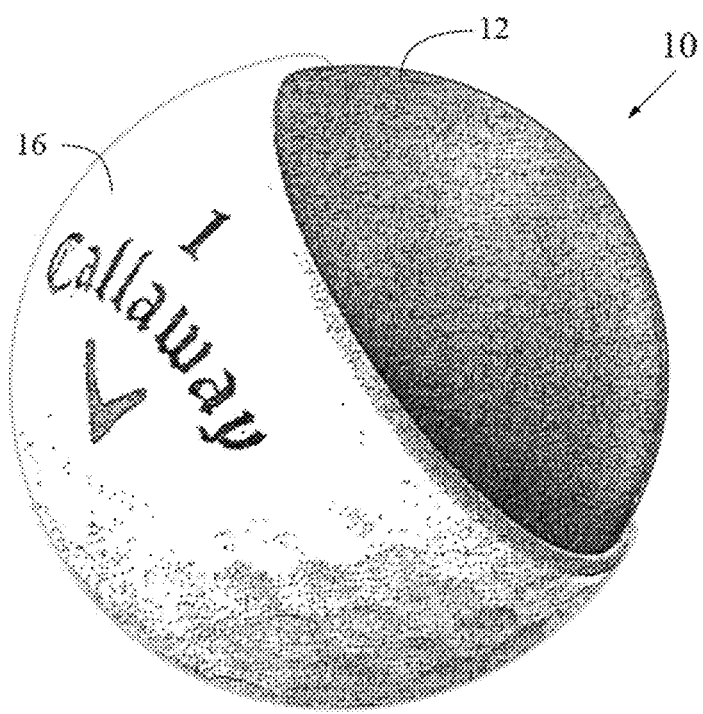
FIG. 12 is an exploded partial cut-away view of a two-piece golf ball.
Figure 13:
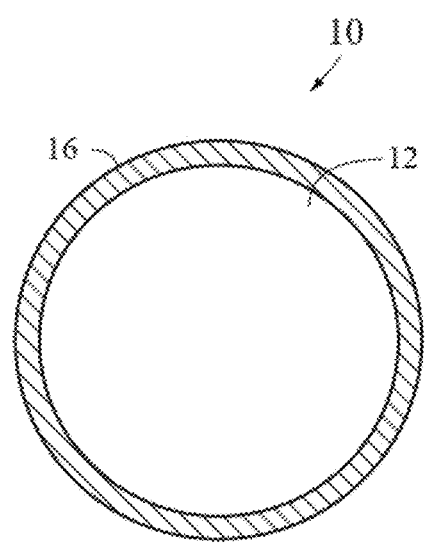
FIG. 13 is a cross-sectional view of a two-piece golf ball.

FIGS. 12 and 13 illustrate a two piece golf ball 20 with a core 25 and a cover 30. The cover comprises an ionomer material and a graphene material in an amount ranging from 0.1 to 5.0 weight percent of the cover.

Figure 14:
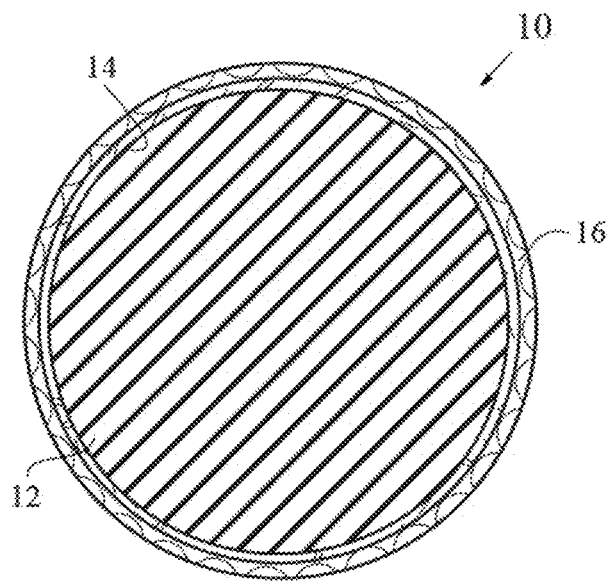
FIG. 14 is a cross-sectional view of a three-piece golf ball.
Figure 15:
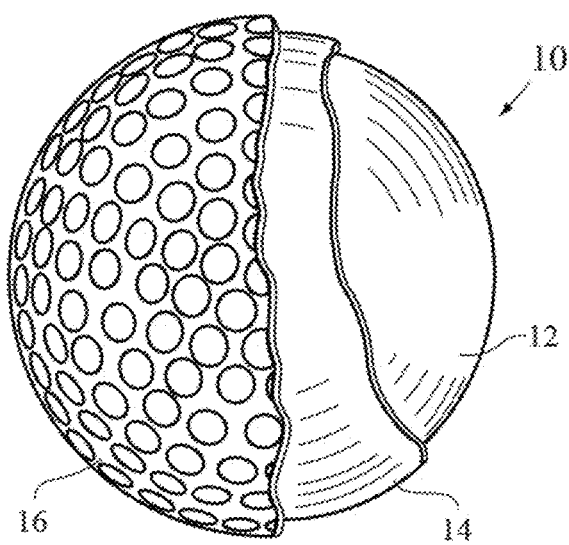
FIG. 15 is an exploded partial cut-away view of a three-piece golf ball.

FIGS. 14 and 15 illustrate a three-piece golf ball 5 comprising a core 10, a mantle layer 14 and a cover 16 with dimples 18, wherein the mantle layer 14 comprises an ionomer material and a graphene material in an amount ranging from 0.1 to 5.0 weight percent of the mantle layer.

Figure 16:
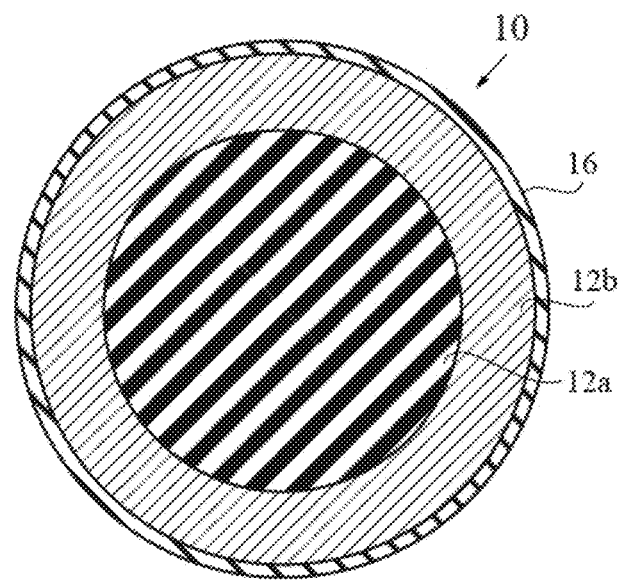
FIG. 16 is a cross-sectional view of a three-piece golf ball with a dual core and a cover.

FIG. 16 illustrates a dual core three piece golf ball 35 comprising an inner core 30, and outer core 32 and a cover 34, wherein the cover comprises an ionomer material and a graphene material in an amount ranging from 0.1 to 5.0 weight percent of the cover.

Figure 17:
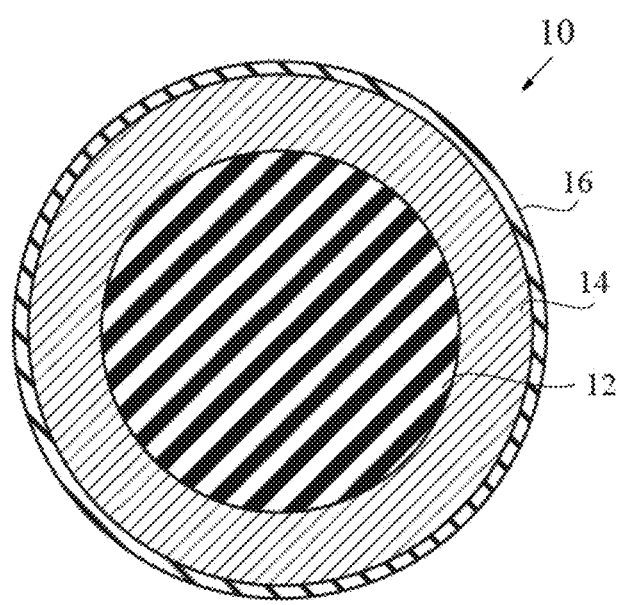
FIG. 17 is a cross-sectional view of a three-piece golf ball with a core, mantle and cover.

FIG. 17 illustrates a three piece golf ball 45 comprising a core 40, a mantle layer 42 and a cover 44, wherein the mantle layer 42 comprises an ionomer material and a graphene material in an amount ranging from 0.1 to 5.0 weight percent of the mantle layer, and the cover 44 comprises an ionomer material and a graphene material in an amount ranging from 0.1 to 5.0 weight percent of the cover.

Figure 18:
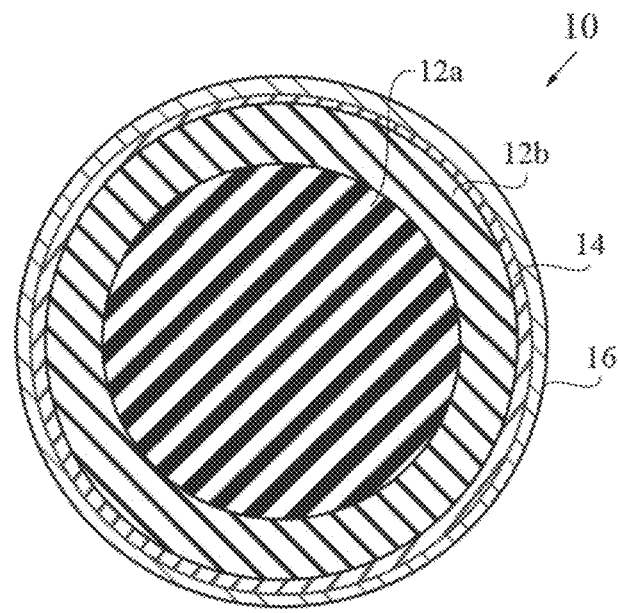
FIG. 18 is a cross-sectional view of a four-piece golf ball with a dual core, mantle layer and a cover.

FIG. 18 illustrates a dual core four piece golf ball 55 comprising an inner core 50, an outer core 52, a mantle layer 54 and a cover 56, wherein the mantle layer 54 comprises an ionomer material and a graphene material in an amount ranging from 0.1 to 5.0 weight percent of the mantle layer, and the cover 56 comprises an ionomer material and a graphene material in an amount ranging from 0.1 to 5.0 weight percent of the cover.

Figure 19:
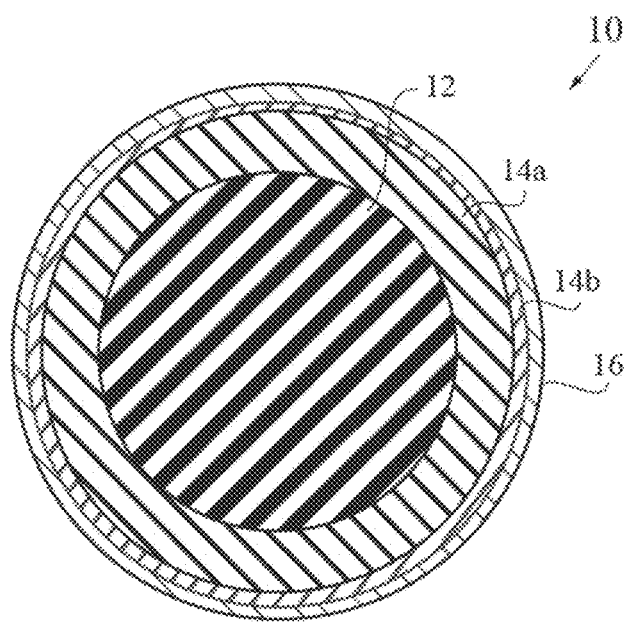
FIG. 19 is a cross-sectional view of a four-piece golf ball with a core, dual mantle layers and a cover.

FIG. 19 illustrates a four piece golf ball 65 comprising a core 60, an inner mantle 62, an outer mantle 64 and a cover 66, wherein the outer mantle layer 64 comprises an ionomer material and a graphene material in an amount ranging from 0.1 to 5.0 weight percent of the mantle layer, and the cover 66 comprises an ionomer material and a graphene material in an amount ranging from 0.1 to 5.0 weight percent of the cover.

The mantle component is preferably composed of the inner mantle layer and the outer mantle layer. The mantle component preferably has a thickness ranging from 0.05 inch to 0.15 inch, and more preferably from 0.06 inch to 0.08 inch. The outer mantle layer is preferably composed of a blend of ionomer materials. One preferred embodiment comprises SURLYN 9150 material, SURLYN 8940 material, a SURLYN AD1022 material, and a masterbatch. The SURLYN 9150 material is preferably present in an amount ranging from 20 to 45 weight percent of the cover, and more preferably 30 to 40 weight percent. The SURLYN 8945 is preferably present in an amount ranging from 15 to 35 weight percent of the cover, more preferably 20 to 30 weight percent, and most preferably 26 weight percent. The SURLYN 9945 is preferably present in an amount ranging from 30 to 50 weight percent of the cover, more preferably 35 to 45 weight percent, and most preferably 41 weight percent.

The SURLYN 8940 is preferably present in an amount ranging from 5 to 15 weight percent of the cover, more preferably 7 to 12 weight percent, and most preferably 10 weight percent.

SURLYN 8320, from DuPont, is a very-low modulus ethylene/methacrylic acid copolymer with partial neutralization of the acid groups with sodium ions. SURLYN 8945, also from DuPont, is a high acid ethylene/methacrylic acid copolymer with partial neutralization of the acid groups with sodium ions. SURLYN 9945, also from DuPont, is a high acid ethylene/methacrylic acid copolymer with partial neutralization of the acid groups with zinc ions. SURLYN 8940, also from DuPont, is an ethylene/methacrylic acid copolymer with partial neutralization of the acid groups with sodium ions.

The inner mantle layer is preferably composed of a blend of ionomers, preferably comprising a terpolymer and at least two high acid (greater than 18 weight percent) ionomers neutralized with sodium, zinc, magnesium, or other metal ions. The material for the inner mantle layer preferably has a Shore D plaque hardness ranging preferably from 35 to 77, more preferably from 36 to 44, a most preferably approximately 40. The thickness of the outer mantle layer preferably ranges from 0.025 inch to 0.050 inch, and is more preferably approximately 0.037 inch. The mass of an insert including the dual core and the inner mantle layer preferably ranges from 32 grams to 40 grams, more preferably from 34 to 38 grams, and is most preferably approximately 36 grams. The inner mantle layer is alternatively composed of a HPF material available from DuPont. Alternatively, the inner mantle layer 14b is composed of a material such as disclosed in Kennedy, III et al., U.S. Pat. No. 7,361,101 for a Golf Ball And Thermoplastic Material, which is hereby incorporated by reference in its entirety.

The outer mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. The material of the outer mantle layer preferably has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. The mass of the entire insert including the core, the inner mantle layer and the outer mantle layer preferably ranges from 38 grams to 43 grams, more preferably from 39 to 41 grams, and is most preferably approximately 41 grams.

In an alternative embodiment, the inner mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. In this embodiment, the material of the inner mantle layer has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. Also in this embodiment, the outer mantle layer 14b is composed of a blend of ionomers, preferably comprising a terpolymer and at least two high acid (greater than 18 weight percent) ionomers neutralized with sodium, zinc, magnesium, or other metal ions. In this embodiment, the material for the outer mantle layer 14b preferably has a Shore D plaque hardness ranging preferably from 35 to 77, more preferably from 36 to 44, a most preferably approximately 40. The thickness of the outer mantle layer preferably ranges from 0.025 inch to 0.100 inch, and more preferably ranges from 0.070 inch to 0.090 inch.

In yet another embodiment wherein the inner mantle layer is thicker than the outer mantle layer and the outer mantle layer is harder than the inner mantle layer, the inner mantle layer is composed of a blend of ionomers, preferably comprising a terpolymer and at least two high acid (greater than 18 weight percent) ionomers neutralized with sodium, zinc, magnesium, or other metal ions. In this embodiment, the material for the inner mantle layer has a Shore D plaque hardness ranging preferably from 30 to 77, more preferably from 30 to 50, and most preferably approximately 40. In this embodiment, the material for the outer mantle layer has a Shore D plaque hardness ranging preferably from 40 to 77, more preferably from 50 to 71, and most preferably approximately 67. In this embodiment, the thickness of the inner mantle layer preferably ranges from 0.030 inch to 0.090 inch, and the thickness of the outer mantle layer ranges from 0.025 inch to 0.070 inch.

Preferably the inner core has a diameter ranging from 0.75 inch to 1.20 inches, more preferably from 0.85 inch to 1.05 inch, and most preferably approximately 0.95 inch. Preferably the inner core 12a has a Shore D hardness ranging from 20 to 50, more preferably from 25 to 40, and most preferably approximately 35. Preferably the inner core has a mass ranging from 5 grams to 15 grams, 7 grams to 10 grams and most preferably approximately 8 grams.

Preferably the outer core has a diameter ranging from 1.25 inch to 1.55 inches, more preferably from 1.40 inch to 1.5 inch, and most preferably approximately 1.5 inch. Preferably the outer core has a Shore D surface hardness ranging from 40 to 65, more preferably from 50 to 60, and most preferably approximately 56. Preferably the outer core is formed from a polybutadiene, zinc diacrylate, zinc oxide, zinc stearate, a peptizer and peroxide. Preferably the combined inner core and outer core have a mass ranging from 25 grams to 35 grams, 30 grams to 34 grams and most preferably approximately 32 grams.

Figure 6:
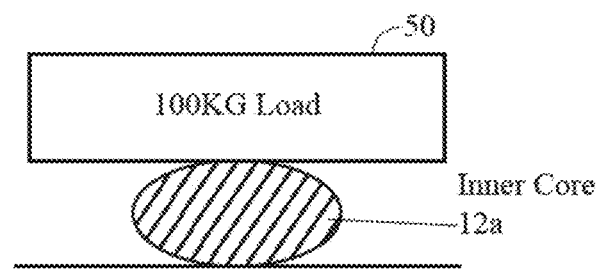
FIG. 6 is a cross-sectional view of an inner core layer under a 100 kilogram load.
Figure 7:
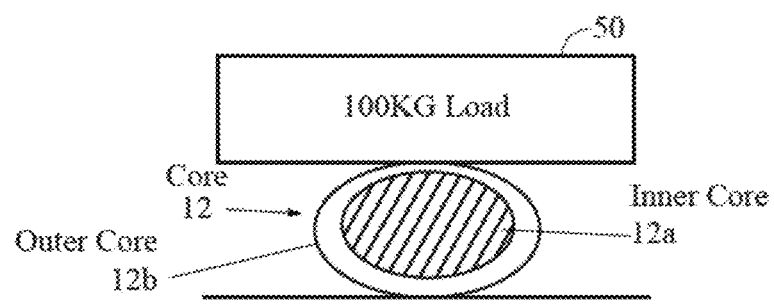
FIG. 7 is a cross-sectional view of a core under a 100 kilogram load.

Preferably the inner core has a deflection of at least 0.230 inch under a load of 220 pounds, and the core has a deflection of at least 0.080 inch under a load of 200 pounds. As shown in FIGS. 6 and 7, a mass 50 is loaded onto an inner core and a core. As shown in FIGS. 6 and 7, the mass is 100 kilograms, approximately 220 pounds. Under a load of 100 kilograms, the inner core preferably has a deflection from 0.230 inch to 0.300 inch. Under a load of 100 kilograms, preferably the core has a deflection of 0.08 inch to 0.150 inch. Alternatively, the load is 200 pounds (approximately 90 kilograms), and the deflection of the core 12 is at least 0.080 inch. Further, a compressive deformation from a beginning load of 10 kilograms to an ending load of 130 kilograms for the inner core ranges from 4 millimeters to 7 millimeters and more preferably from 5 millimeters to 6.5 millimeters. The dual core deflection differential allows for low spin off the tee to provide greater distance, and high spin on approach shots.

In an alternative embodiment of the golf ball shown in FIG. 5A, the golf ball 10 comprises an inner core 12a, an intermediate core 12b, an outer core 12b, a mantle 14 and a cover 16. The golf ball 10 preferably has a diameter of at least 1.68 inches, a mass ranging from 45 grams to 47 grams, a COR of at least 0.79, a deformation under a 100 kilogram loading of at least 0.07 mm.

In one embodiment, the golf ball comprises a core, a mantle layer and a cover layer. The core comprises an inner core sphere, an intermediate core layer and an outer core layer. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer. The mantle layer is disposed over the core, comprises an ionomer material and has a Shore D hardness greater than 55. The cover layer is disposed over the mantle layer comprises a thermoplastic polyurethane material and has a Shore A hardness less than 100. The golf ball has a diameter of at least 1.68 inches. The mantle layer is harder than the outer core layer, the outer core layer is harder than the intermediate core layer, the intermediate core layer is harder than the inner core sphere, and the cover layer is softer than the mantle layer.

In another embodiment, shown in FIGS. 8 and 9, the golf ball 10 has a multi-layer core and multi-layer mantle. The golf ball includes a core, a mantle component and a cover layer. The core comprises an inner core sphere, an intermediate core layer and an outer core layer. The inner core sphere comprises a TPEE material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer 12c. The inner mantle layer is disposed over the core, comprises an ionomer material and has a Shore D hardness greater than 55. The outer mantle layer is disposed over the inner mantle layer, comprises an ionomer material and has a Shore D hardness greater than 60. The cover layer is disposed over the mantle component, comprises a thermoplastic polyurethane material and has a Shore A hardness less than 100. The golf ball has a diameter of at least 1.68 inches. The outer mantle layer is harder than the inner mantle layer, the inner mantle layer is harder than the outer core layer, the outer core layer is harder than the intermediate core layer, the intermediate core layer is harder than the inner core sphere, and the cover layer is softer than the outer mantle layer.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety.

Various aspects of the present invention golf balls have been described in terms of certain tests or measuring procedures. These are described in greater detail as follows.

As used herein, "Shore D hardness" of the golf ball layers is measured generally in accordance with ASTM D-2240 type D, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore D hardness of the cover is measured while the cover remains over the mantles and cores. When a hardness measurement is made on the golf ball, the Shore D hardness is preferably measured at a land area of the cover.

As used herein, "Shore A hardness" of a cover is measured generally in accordance with ASTM D-2240 type A, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore A hardness of the cover is measured while the cover remains over the mantles and cores. When a hardness measurement is made on the golf ball, Shore A hardness is preferably measured at a land area of the cover The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the COR and the surface configuration of the ball.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of ballistic screens, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The measurements for deflection, compression, hardness, and the like are preferably performed on a finished golf ball as opposed to performing the measurement on each layer during manufacturing.

Preferably, in a five layer golf ball comprising an inner core, an outer core, an inner mantle layer, an outer mantle layer and a cover, the hardness/compression of layers involve an inner core with the greatest deflection (lowest hardness), an outer core (combined with the inner core) with a deflection less than the inner core, an inner mantle layer with a hardness less than the hardness of the combined outer core and inner core, an outer mantle layer with the hardness layer of the golf ball, and a cover with a hardness less than the hardness of the outer mantle layer. These measurements are preferably made on a finished golf ball that has been torn down for the measurements.

Preferably the inner mantle layer is thicker than the outer mantle layer or the cover layer. The dual core and dual mantle golf ball creates an optimized velocity-initial velocity ratio (Vi/IV), and allows for spin manipulation. The dual core provides for increased core compression differential resulting in a high spin for short game shots and a low spin for driver shots. A discussion of the USGA initial velocity test is disclosed in Yagley et al., U.S. Pat. No. 6,595,872 for a Golf Ball With High Coefficient Of Restitution, which is hereby incorporated by reference in its entirety. Another example is Bartels et al., U.S. Pat. No. 6,648,775 for a Golf Ball With High Coefficient Of Restitution, which is hereby incorporated by reference in its entirety.

The cover may be composed of a cover material disclosed in Petrich et al., U.S. patent application Ser. No. 16/164,661, filed on Oct. 18, 2018, for a Graphene Core For A Golf Ball With A Soft Cover, which is hereby incorporated by reference in its entirety.

Crast et al., U.S. Pat. No. 6,632,877, for a Dual Curable Coating, is hereby incorporated by reference in its entirety.

Skrabski et al., U.S. Pat. No. 6,544,337, for a Golf ball Painting System, is hereby incorporated by reference in its entirety.

Crast et al., U.S. Pat. No. 6,365,679, for a Two component polyurethane clear coat for golf balls, is hereby incorporated by reference in its entirety.

Crast et al., U.S. Pat. No. 6,165,564, for a UV Clearable Clear Coat For Golf Balls, is hereby incorporated by reference in its entirety.

Skrabski et al., U.S. Pat. No. 6,319,563, for a Golf ball Painting Method, is hereby incorporated by reference in its entirety.

Bartels, U.S. Pat. No. 9,278,260, for a Low Compression Three-Piece Golf Ball With An Aerodynamic Drag Rise At High Speeds, is hereby incorporated by reference in its entirety.

Chavan et al, U.S. Pat. No. 9,789,366, for a Graphene Core For A Golf Ball, is hereby incorporated by reference in its entirety.

Chavan et al, U.S. patent application Ser. No. 15/705,011, filed on Sep. 14, 2017, for a Graphene Core For A Golf Ball, is hereby incorporated by reference in its entirety.

Chavan et al, U.S. patent application Ser. No. 15/729,231, filed on Oct. 10, 2017, for a Graphene And Nanotube Reinforced Golf Ball, is hereby incorporated by reference in its entirety.

One embodiment of the present invention is a golf ball comprising a core, a mantle layer comprising an ionomer material and a graphene material in an amount ranging from 0.1 to 5.0 weight percent of the mantle layer, and a cover layer disposed over the mantle layer.

Another embodiment of the present invention is a golf ball comprising a core, an inner mantle layer, and outer mantle layer and a cover layer. The inner mantle layer is disposed over the core. The inner mantle layer has a thickness ranging from 0.03 inch to 0.09 inch. The inner mantle layer is composed of an ionomer material. The inner mantle layer material having a plaque Shore D hardness ranging from 34 to 55. The outer mantle layer is disposed over the inner mantle layer. The outer mantle layer has a thickness ranging from 0.025 inch to 0.050 inch. The outer mantle layer comprises an ionomer material and a graphene material in an amount ranging from 0.1 to 5.0 weight percent of the outer mantle layer. The cover layer is disposed over the outer mantle layer. The cover layer has a thickness ranging from 0.025 inch to 0.040 inch.

Another embodiment of the present invention is a golf ball comprising a core, an inner mantle layer, and outer mantle layer and a cover layer. The inner mantle layer is disposed over the core. The inner mantle layer has a thickness ranging from 0.030 inch to 0.090 inch. The inner mantle layer comprises an ionomer material and a graphene material in an amount ranging from 0.1 to 5.0 weight percent of the inner mantle layer. The outer mantle layer is disposed over the inner mantle layer. The outer mantle layer has a thickness ranging from 0.025 inch to 0.070 inch. The outer mantle layer material has a plaque Shore D hardness ranging from 50 to 71. The inner mantle is thicker than the outer mantle, and the outer mantle is harder than the inner mantle. The cover layer is disposed over the outer mantle layer. The cover layer has a thickness ranging from 0.025 inch to 0.050 inch.

Yet another embodiment of the present invention is a golf ball comprising a core, an inner mantle layer, and outer mantle layer and a cover layer. The inner mantle layer is disposed over the core. The inner mantle layer has a thickness ranging from 0.070 inch to 0.090 inch. The inner mantle layer is composed of an ionomer material. The inner mantle layer material has a plaque Shore D hardness ranging from 36 to 44. The outer mantle layer is disposed over the inner mantle layer. The outer mantle layer has a thickness ranging from 0.025 inch to 0.040 inch. The outer mantle layer is composed of an ionomer material. The outer mantle layer material has a plaque Shore D hardness ranging from 65 to 71. The cover layer is disposed over the outer mantle layer, the cover layer comprising an ionomer material and a graphene material in an amount ranging from 0.1 to 5.0 weight percent of the cover layer.

Yet another embodiment of the present invention is a golf ball comprising a core, an inner mantle layer, and outer mantle layer and a cover layer. The inner mantle layer is disposed over the core. The inner mantle layer has a thickness ranging from 0.070 inch to 0.090 inch. The inner mantle layer is composed of an ionomer material. The inner mantle layer material has a plaque Shore D hardness ranging from 36 to 44. The outer mantle layer is disposed over the inner mantle layer. The outer mantle layer has a thickness ranging from 0.025 inch to 0.040 inch. The outer mantle layer is composed of an ionomer material. The outer mantle layer material has a plaque Shore D hardness ranging from 65 to 71. The cover layer is disposed over the outer mantle layer. The cover layer comprises a polyurethane material and a graphene material in an amount ranging from 0.1 to 5.0 weight percent of the cover layer.

Yet another embodiment of the present invention is a golf ball comprising a core, an inner mantle layer, and outer mantle layer and a cover layer. The cover layer comprises a polyurethane material and a graphene material in an amount ranging from 0.1 to 5.0 weight percent of the cover layer.

Yet another embodiment of the present invention is a golf ball comprising a core, a mantle layer disposed over the core, and a cover layer is disposed over the mantle layer. The cover layer comprises a polyurethane material and a graphene material in an amount ranging from 0.1 to 5.0 weight percent of the cover layer.

Yet another embodiment of the present invention is a golf ball comprising a core, an inner mantle layer, and outer mantle layer and a cover layer. The core comprises a polybutadiene material and a graphene material in an amount ranging from 0.1 to 5.0 weight percent of the core. The inner mantle layer is disposed over the core. The inner mantle layer comprises an ionomer material and a graphene material in an amount ranging from 0.1 to 5.0 weight percent of the inner mantle layer. The outer mantle layer is disposed over the inner mantle layer. The outer mantle layer comprises an ionomer material and a graphene material in an amount ranging from 0.1 to 5.0 weight percent of the outer mantle layer. The cover layer is disposed over the outer mantle layer. The cover layer comprises a polyurethane material and a graphene material in an amount ranging from 0.1 to 5.0 weight percent of the cover layer.

Yet another embodiment of the present invention is a golf ball comprising a core, a mantle layer and a cover layer. The core comprises a polybutadiene material and a graphene material in an amount ranging from 0.1 to 5.0 weight percent of the core. The mantle layer is disposed over the core. The mantle layer comprises an ionomer material and a graphene material in an amount ranging from 0.1 to 5.0 weight percent of the mantle layer. The cover layer is disposed over the mantle layer, the cover layer comprising a polyurethane material and a graphene material in an amount ranging from 0.1 to 5.0 weight percent of the cover layer.

Yet another embodiment of the present invention is a golf ball comprising a core, an inner mantle layer, and outer mantle layer and a cover layer. The core comprises a polybutadiene material and a graphene material in an amount ranging from 0.1 to 5.0 weight percent of the core. The inner mantle layer is disposed over the core. The inner mantle layer comprises an ionomer material and a graphene material in an amount ranging from 0.1 to 5.0 weight percent of the inner mantle layer. The outer mantle layer is disposed over the inner mantle layer. The outer mantle layer comprises an ionomer material and a graphene material in an amount ranging from 0.1 to 5.0 weight percent of the outer mantle layer. The cover layer is disposed over the outer mantle layer. The cover layer comprises an ionomer material and a graphene material in an amount ranging from 0.1 to 5.0 weight percent of the cover layer.

Yet another embodiment of the present invention is a golf ball comprising a core, a mantle layer and a cover layer. The core comprises a polybutadiene material and a graphene material in an amount ranging from 0.1 to 5.0 weight percent of the core. The mantle layer is disposed over the core. The mantle layer comprises an ionomer material and a graphene material in an amount ranging from 0.1 to 5.0 weight percent of the mantle layer. The cover layer is disposed over the mantle layer. The cover layer comprises an ionomer material and a graphene material in an amount ranging from 0.1 to 5.0 weight percent of the cover layer.

Yet another embodiment of the present invention is a golf ball comprising a center core, an outer core, a mantle layer and a cover layer. The center core comprises a polybutadiene material and a graphene material in an amount ranging from 0.1 to 5.0 weight percent of the center core. The outer core comprises a polybutadiene material and a graphene material in an amount ranging from 0.1 to 5.0 weight percent of the outer core. The mantle layer is disposed over the outer core. The mantle layer comprises an ionomer material and a graphene material in an amount ranging from 0.1 to 5.0 weight percent of the mantle layer. The cover layer is disposed over the mantle layer. The cover layer comprises an ionomer material and a graphene material in an amount ranging from 0.1 to 5.0 weight percent of the cover layer.

Yet another embodiment of the present invention is a golf ball comprising a center core, an outer core, a mantle layer and a cover layer. The center core comprises a polybutadiene material and a graphene material in an amount ranging from 0.1 to 5.0 weight percent of the center core. The outer core comprises a polybutadiene material and a graphene material in an amount ranging from 0.1 to 5.0 weight percent of the outer core. The mantle layer is disposed over the outer core. The mantle layer comprises an ionomer material and a graphene material in an amount ranging from 0.1 to 5.0 weight percent of the mantle layer. The cover layer is disposed over the mantle layer. The cover layer comprises a polyurethane material and a graphene material in an amount ranging from 0.1 to 5.0 weight percent of the cover layer.

Yet another embodiment of the present invention is a golf ball comprising a core, a mantle layer and a cover layer. The mantle layer comprises an ionomer material and a graphene oxide material in an amount ranging from 0.1 to 5.0 weight percent of the mantle layer. The cover layer is disposed over the mantle layer.

Another embodiment of the present invention is a golf ball comprising a core, an inner mantle layer, and outer mantle layer and a cover layer. The inner mantle layer is disposed over the core. The inner mantle layer has a thickness ranging from 0.03 inch to 0.09 inch. The inner mantle layer is composed of an ionomer material. The inner mantle layer material having a plaque Shore D hardness ranging from 34 to 55. The outer mantle layer is disposed over the inner mantle layer. The outer mantle layer has a thickness ranging from 0.025 inch to 0.050 inch. The outer mantle layer comprises an ionomer material and a graphene oxide material in an amount ranging from 0.1 to 5.0 weight percent of the outer mantle layer. The cover layer is disposed over the outer mantle layer. The cover layer has a thickness ranging from 0.025 inch to 0.040 inch.

Another embodiment of the present invention is a golf ball comprising a core, an inner mantle layer, and outer mantle layer and a cover layer. The inner mantle layer is disposed over the core. The inner mantle layer has a thickness ranging from 0.030 inch to 0.090 inch. The inner mantle layer comprises an ionomer material and a graphene oxide material in an amount ranging from 0.1 to 5.0 weight percent of the inner mantle layer. The outer mantle layer is disposed over the inner mantle layer. The outer mantle layer has a thickness ranging from 0.025 inch to 0.070 inch. The outer mantle layer material has a plaque Shore D hardness ranging from 50 to 71. The inner mantle is thicker than the outer mantle, and the outer mantle is harder than the inner mantle. The cover layer is disposed over the outer mantle layer. The cover layer has a thickness ranging from 0.025 inch to 0.050 inch.

Yet another embodiment of the present invention is a golf ball comprising a core, an inner mantle layer, and outer mantle layer and a cover layer. The inner mantle layer is disposed over the core. The inner mantle layer has a thickness ranging from 0.070 inch to 0.090 inch. The inner mantle layer is composed of an ionomer material. The inner mantle layer material has a plaque Shore D hardness ranging from 36 to 44. The outer mantle layer is disposed over the inner mantle layer. The outer mantle layer has a thickness ranging from 0.025 inch to 0.040 inch. The outer mantle layer is composed of an ionomer material. The outer mantle layer material has a plaque Shore D hardness ranging from 65 to 71. The cover layer is disposed over the outer mantle layer, the cover layer comprising an ionomer material and a graphene oxide material in an amount ranging from 0.1 to 5.0 weight percent of the cover layer.

Yet another embodiment of the present invention is a golf ball comprising a core, an inner mantle layer, and outer mantle layer and a cover layer. The inner mantle layer is disposed over the core. The inner mantle layer has a thickness ranging from 0.070 inch to 0.090 inch. The inner mantle layer is composed of an ionomer material. The inner mantle layer material has a plaque Shore D hardness ranging from 36 to 44. The outer mantle layer is disposed over the inner mantle layer. The outer mantle layer has a thickness ranging from 0.025 inch to 0.040 inch. The outer mantle layer is composed of an ionomer material. The outer mantle layer material has a plaque Shore D hardness ranging from 65 to 71. The cover layer is disposed over the outer mantle layer. The cover layer comprises a polyurethane material and a graphene oxide material in an amount ranging from 0.1 to 5.0 weight percent of the cover layer.

Yet another embodiment of the present invention is a golf ball comprising a core, an inner mantle layer, and outer mantle layer and a cover layer. The cover layer comprises a polyurethane material and a graphene oxide material in an amount ranging from 0.1 to 5.0 weight percent of the cover layer.

Yet another embodiment of the present invention is a golf ball comprising a core, a mantle layer disposed over the core, and a cover layer is disposed over the mantle layer. The cover layer comprises a polyurethane material and a graphene oxide material in an amount ranging from 0.1 to 5.0 weight percent of the cover layer.

Yet another embodiment of the present invention is a golf ball comprising a core, an inner mantle layer, and outer mantle layer and a cover layer. The core comprises a polybutadiene material and a graphene oxide material in an amount ranging from 0.1 to 5.0 weight percent of the core. The inner mantle layer is disposed over the core. The inner mantle layer comprises an ionomer material and a graphene oxide material in an amount ranging from 0.1 to 5.0 weight percent of the inner mantle layer. The outer mantle layer is disposed over the inner mantle layer. The outer mantle layer comprises an ionomer material and a graphene oxide material in an amount ranging from 0.1 to 5.0 weight percent of the outer mantle layer. The cover layer is disposed over the outer mantle layer. The cover layer comprises a polyurethane material and a graphene oxide material in an amount ranging from 0.1 to 5.0 weight percent of the cover layer.

Yet another embodiment of the present invention is a golf ball comprising a core, a mantle layer and a cover layer. The core comprises a polybutadiene material and a graphene oxide material in an amount ranging from 0.1 to 5.0 weight percent of the core. The mantle layer is disposed over the core. The mantle layer comprises an ionomer material and a graphene oxide material in an amount ranging from 0.1 to 5.0 weight percent of the mantle layer. The cover layer is disposed over the mantle layer, the cover layer comprising a polyurethane material and a graphene oxide material in an amount ranging from 0.1 to 5.0 weight percent of the cover layer.

Yet another embodiment of the present invention is a golf ball comprising a core, an inner mantle layer, and outer mantle layer and a cover layer. The core comprises a polybutadiene material and a graphene oxide material in an amount ranging from 0.1 to 5.0 weight percent of the core. The inner mantle layer is disposed over the core. The inner mantle layer comprises an ionomer material and a graphene oxide material in an amount ranging from 0.1 to 5.0 weight percent of the inner mantle layer. The outer mantle layer is disposed over the inner mantle layer. The outer mantle layer comprises an ionomer material and a graphene oxide material in an amount ranging from 0.1 to 5.0 weight percent of the outer mantle layer. The cover layer is disposed over the outer mantle layer. The cover layer comprises an ionomer material and a graphene oxide material in an amount ranging from 0.1 to 5.0 weight percent of the cover layer.

Yet another embodiment of the present invention is a golf ball comprising a core, a mantle layer and a cover layer. The core comprises a polybutadiene material and a graphene oxide material in an amount ranging from 0.1 to 5.0 weight percent of the core. The mantle layer is disposed over the core. The mantle layer comprises an ionomer material and a graphene oxide material in an amount ranging from 0.1 to 5.0 weight percent of the mantle layer. The cover layer is disposed over the mantle layer. The cover layer comprises an ionomer material and a graphene oxide material in an amount ranging from 0.1 to 5.0 weight percent of the cover layer.

Yet another embodiment of the present invention is a golf ball comprising a center core, an outer core, a mantle layer and a cover layer. The center core comprises a polybutadiene material and a graphene oxide material in an amount ranging from 0.1 to 5.0 weight percent of the center core. The outer core comprises a polybutadiene material and a graphene oxide material in an amount ranging from 0.1 to 5.0 weight percent of the outer core. The mantle layer is disposed over the outer core. The mantle layer comprises an ionomer material and a graphene oxide material in an amount ranging from 0.1 to 5.0 weight percent of the mantle layer. The cover layer is disposed over the mantle layer. The cover layer comprises an ionomer material and a graphene oxide material in an amount ranging from 0.1 to 5.0 weight percent of the cover layer.

Yet another embodiment of the present invention is a golf ball comprising a center core, an outer core, a mantle layer and a cover layer. The center core comprises a polybutadiene material and a graphene oxide material in an amount ranging from 0.1 to 5.0 weight percent of the center core. The outer core comprises a polybutadiene material and a graphene oxide material in an amount ranging from 0.1 to 5.0 weight percent of the outer core. The mantle layer is disposed over the outer core. The mantle layer comprises an ionomer material and a graphene oxide material in an amount ranging from 0.1 to 5.0 weight percent of the mantle layer. The cover layer is disposed over the mantle layer. The cover layer comprises a polyurethane material and a graphene oxide material in an amount ranging from 0.1 to 5.0 weight percent of the cover layer.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A golf ball comprising:
   a core;
   a mantle layer comprising an ionomer material and a graphene material in an amount ranging from 0.1 to 5.0 weight percent of the mantle layer; and
   a cover layer disposed over the mantle layer.

2. The golf ball according to claim 1 wherein the graphene material ranges from 0.4 to 2.5 weight percent of the mantle layer.

3. The golf ball according to claim 1 wherein the graphene material ranges from 0.6 to 1.5 weight percent of the mantle layer.

4. A golf ball comprising:
   a core;
   an inner mantle layer disposed over the core, the inner mantle layer having a thickness ranging from 0.03 inch to 0.09 inch, the inner mantle layer composed of an ionomer material, the inner mantle layer material having a plaque Shore D hardness ranging from 34 to 55;
   an outer mantle layer disposed over the inner mantle layer, the outer mantle layer having a thickness ranging from 0.025 inch to 0.050 inch, the outer mantle layer comprising an ionomer material and a graphene material in an amount ranging from 0.1 to 5.0 weight percent of the outer mantle layer; and
   a cover layer disposed over the outer mantle layer, the cover layer has a thickness ranging from 0.025 inch to 0.040 inch.

5. A golf ball comprising:
   a core;
   an inner mantle layer disposed over the core, the inner mantle layer having a thickness ranging from 0.030 inch to 0.090 inch, the inner mantle layer comprising an ionomer material and a graphene material in an amount ranging from 0.1 to 5.0 weight percent of the inner mantle layer;
   an outer mantle layer disposed over the inner mantle layer, the outer mantle layer having a thickness ranging from 0.025 inch to 0.070 inch, the outer mantle layer material having a plaque Shore D hardness ranging from 50 to 71, wherein the inner mantle is thicker than the outer mantle, and the outer mantle is harder than the inner mantle; and
   a cover layer is disposed over the outer mantle layer, the cover layer having a thickness ranging from 0.025 inch to 0.050 inch.

* * * * *